US012285378B2

(12) United States Patent
Wang et al.

(10) Patent No.: US 12,285,378 B2
(45) Date of Patent: Apr. 29, 2025

(54) PLUG-IN MASSAGE STRUCTURE AND PLUG-IN MASSAGE DEVICE

(71) Applicants: UC GLOBAL TRADE INC., Chino, CA (US); Dongguan Qianmei Intelligent Technology Co., Ltd, Dongguan (CN)

(72) Inventors: Rong Wang, Chino, CA (US); Xike He, Maoming (CN)

(73) Assignees: UC GLOBAL TRADE INC., Chino, CA (US); Dongguan Qianmei Intelligent Technology Co, . Ltd, Dongguan (CN)

( * ) Notice: Subject to any disclaimer, the term of this patent is extended or adjusted under 35 U.S.C. 154(b) by 0 days.

(21) Appl. No.: 18/672,048

(22) Filed: May 23, 2024

(65) Prior Publication Data

US 2024/0307261 A1 Sep. 19, 2024

(30) Foreign Application Priority Data

Dec. 11, 2023 (CN) ......................... 202323377999.5
Mar. 15, 2024 (CN) ......................... 202410297595.5

(51) Int. Cl.
*A61H 19/00* (2006.01)
*A61H 7/00* (2006.01)

(52) U.S. Cl.
CPC ..... *A61H 19/44* (2013.01); *A61H 2201/0153* (2013.01); *A61H 2201/1669* (2013.01)

(58) Field of Classification Search
CPC ............ A61H 19/44; A61H 2201/0153; A61H 2201/1669; A61H 7/00; A61H 7/007;
(Continued)

(56) References Cited

U.S. PATENT DOCUMENTS 3,996,930 A * 12/1976 Sekulich ................ A61H 19/34 601/137
8,545,392 B2 * 10/2013 Standfest ............... A61H 19/44 600/38
(Continued)

FOREIGN PATENT DOCUMENTS

CN 107028740 B 3/2019
CN 215021900 U 12/2021
(Continued)

*Primary Examiner* — Justine R Yu
*Assistant Examiner* — Alexander Morales
(74) *Attorney, Agent, or Firm* — Bayramoglu Law Offices LLC

(57) ABSTRACT

A plug-in massage structure and a plug-in massage device are provided. The plug-in massage structure includes a carrier having a cylindrical area and a recess area, and the carrier can be fully inserted into a hole-shaped part to be massaged; the cylindrical area is an approximately cylindrical structure matched with an inner cavity of the hole-shaped part to be massaged; the virtual cylinder is a virtual cylindrical structure formed by the cylindrical area maintaining its cylindrical end surface and extending to the recess area; a depth of the recess area is M, and M is a height of a tunnel center line of the tunnel-type recess structure; a massage assembly having massage elements disposed in the recess area; and the massage elements each has a degree of freedom A in the recess area.

16 Claims, 12 Drawing Sheets

(58) Field of Classification Search
CPC ........ A61H 7/008; A61H 19/34; A61H 19/40; A61H 2023/002
USPC ............................................... 600/38; 601/61
See application file for complete search history.

(56) References Cited

U.S. PATENT DOCUMENTS

| | | | | |
|---|---|---|---|---|
| 9,737,457 | B2 * | 8/2017 | Allen | A61H 23/02 |
| 9,889,064 | B1 * | 2/2018 | Olivares | A61H 19/40 |
| 11,129,767 | B1 * | 9/2021 | Haddock Dicarlo | A61H 19/34 |
| 11,771,619 | B1 † | 10/2023 | Yan | |
| 2006/0047181 | A1 * | 3/2006 | Hsu | A61H 21/00 600/38 |
| 2014/0046127 | A1 * | 2/2014 | Topolovac | A61H 23/04 600/38 |
| 2016/0000643 | A1 * | 1/2016 | Makower | A61H 9/0007 600/38 |
| 2017/0095397 | A1 * | 4/2017 | Barnard | A61H 23/02 |
| 2020/0085674 | A1 * | 3/2020 | Haddock | A61H 21/00 |
| 2020/0093682 | A1 * | 3/2020 | Haddock | A61H 19/40 |
| 2023/0024137 | A1 * | 1/2023 | Larkin | A61H 19/44 |
| 2023/0355463 | A1 * | 11/2023 | Cirillo-Schmidt | A61H 23/0263 |

FOREIGN PATENT DOCUMENTS

| | | | |
|---|---|---|---|
| CN | 219642416 | U | 9/2023 |
| TW | M318422 | † | 9/2007 |

* cited by examiner
† cited by third party

PLUG-IN MASSAGE STRUCTURE AND PLUG-IN MASSAGE DEVICE

CROSS-REFERENCE TO THE RELATED APPLICATIONS

This application is based upon and claims priority to Chinese Patent Application No. 202323377999.5, filed on Dec. 11, 2023; and Chinese Patent Application No. 202410297595.5, filed on Mar. 15, 2024, the entire contents of which are incorporated herein by reference.

TECHNICAL FIELD

The present disclosure belongs to the field of massage technology, relates to technology for improving massage stimulation effects, and particularly relates to a plug-in massage structure and a plug-in massage device.

BACKGROUND

A plug-in massage device can be inserted into a female vagina to provide sexual massage stimulation, and can also serve as a rehabilitation physiotherapy device to provide repair treatment for the vagina.

In the prior art, massage devices usually take the following forms:

First is named "a two-way kneading and rubbing massager", where a pair of massage members of a massage mechanism is driven to move closer to or away from each other in an up-and-down direction, such that the massage members perform kneading and rubbing actions on a massaged part.

However, the above massager is incapable of being plugged into a female body to perform rehabilitation massage on key postpartum parts needing rehabilitation, moreover, this massager focuses on kneading the shoulders and neck, but the postpartum parts needing rehabilitation have wound and are smoother, and cannot withstand relatively violent kneading actions that easily result in secondary injury to the postpartum parts needing rehabilitation.

Second is named "a multi-point kneading vibration massage device", which implements vibration and kneading massage of a specific massage part through a massage mechanism located at an end of the main body.

However, massage effects provided by the massage mechanism of this massage device are positively correlated with a size of the massage mechanism, therefore, it cannot enter the female body in a large size, but the vibration and kneading effect of a small size are significantly reduced, making it difficult to implement massage of specific parts needing rehabilitation.

Third is named "a vaginal mucosa repair model", where massage balls are contracted and expanded through pneumatic pressurization, such that plug-in massage stimulation of the massaged parts is realized.

However, for this massage structure, massage stimulation points formed by the massage balls are relatively fixed, and massaged regions radiated by the massage balls are also limited, reducing the massage effects; of course, the massage stimulation points inside the body can be adjusted by manually extending or retracting the main body, which, however, will cause friction between the main body and a hole-shaped part to be massaged, easily resulting in secondary injury.

Furthermore, all of the above massagers have the problem that no action space is available for the massage members, making the acting force exerted on the hole-shaped part to be massaged by the massage members relatively rigid and strong, thus easily resulting in an increase in massage pain and a decrease in physical comfort.

SUMMARY

In order to solve the above technical problems, the present disclosure provides a plug-in massage structure and a plug-in massage device.

In order to achieve the above objectives, the present disclosure adopts a technical solution as follows:

a plug-in massage structure, at least including:

a carrier having a cylindrical area and a recess area, where the carrier can be fully inserted into a hole-shaped part to be massaged;

where the cylindrical area is an approximately cylindrical structure matched with an inner cavity of the hole-shaped part to be massaged;

where the recess area has a tunnel-type recess structure opposite to a virtual cylinder;

where the virtual cylinder is a virtual cylindrical structure formed by the cylindrical area maintaining its cylindrical end surface and extending to the recess area;

where a depth of the recess area is M, and M is a height of a tunnel center line of the tunnel-type recess structure;

a massage assembly having massage elements disposed in the recess area; and the massage elements each has a degree of freedom in the recess area.

Preferably, the massage elements each at least has a stimulation surface capable of interacting with the inner cavity of the hole-shaped part to be massaged;

generation of effects is controlled by actions of the massage elements allowed by the degree of freedom; and the effects include at least touch pressure effects that form a point-like area in the inner cavity of the hole-shaped part to be massaged.

Preferably, the stimulation surface has an initial position P0;

the initial position P0 is a position of the stimulation surface in an initial state;

the initial state is a state that is not controlled by an action of the degree of freedom; and the stimulation surface at the initial position P0 has a height h0, and the height h0 is a maximum value of a vertical distance from a center of the stimulation surface of the degree of freedom to a bottom of the recess area.

Preferably, 1 mm≤h0−M≤5 mm;

Preferably, the massage assembly has a first massage element and a second massage element;

within the degree of freedom, the massage assembly performs reciprocating movement in an axis direction of the approximately cylindrical structure; and during the reciprocating movement, the first massage element and the second massage element move in opposite directions, forming repeated kneading actions.

Preferably, the massage elements are controlled by the degree of freedom, enabling the stimulation surface to have a first extreme position P1;

the first extreme position P1 is a one maximum displacement position of the stimulation surface within an allowable stroke section of the degree of freedom; and the stimulation surface at the first extreme position P1 has a height h1, and the height h1 is the maximum value of the vertical distance from the center of the stimulation surface of the degree of freedom to the bottom of the recess area.

Preferably, when the position of the simulation surface changes merely in the first direction, 1 mm≤h1−M≤5 mm;

when the position of the simulation surface changes merely in the second direction, 1 mm≤h1−M≤2 mm;

when the position of the simulation surface changes in both the first direction and the second direction, 0.3 mm≤h1−M≤2 mm;

the first direction is a width or length direction of the recess area; and the second direction is a depth direction of the recess area.

Preferably, the massage elements are controlled by the degree of freedom, enabling the stimulation surface to have a second extreme position P2;

the second extreme position P2 is the other maximum displacement position of the stimulation surface within the allowable stroke section of the degree of freedom A; and the stimulation surface at the second extreme position P2 has a height h2, and the height h2 is the maximum value of the vertical distance from the center of the stimulation surface of the degree of freedom to the bottom of the recess area.

Preferably, when the position of the simulation surface changes merely in the first direction, 1 mm≤h2−M≤5 mm;

when the position of the simulation surface changes merely in the second direction, 3.5 mm≤h2−M≤6 mm;

when the position of the simulation surface changes in both the first direction and the second direction, 2.5 mm≤h2−M≤25 mm;

the first direction is the width or length direction of the recess area; and the second direction is the depth direction of the recess area.

Preferably, a value range of the depth M of the recess area is 8 mm-20 mm;

and/or, the recess area has a first parameter L1, and a value range of the first parameter L1 is 20 mm-100 mm;

where the first parameter L1 is a maximum axial distance between two extreme distal centers 01 of the recess area away from a center of the virtual surface region of the virtual cylindrical structure; and the extreme distal centers 01 are farthest boundary nodes of the recess area.

Preferably, a value range of the depth M of the recess area is 8 mm-20 mm;

and/or, the recess area has a second parameter L2, and a value range of the second parameter L2 is 10 mm-30 mm;

where the second parameter L2 is a maximum radial distance between two extreme distal centers 02 of the recess area away from the center of the virtual surface region of the virtual cylindrical structure; and the extreme distal centers 02 are farthest boundary nodes of the recess area.

Preferably, a value range of the depth M of the recess area is 8 mm-20 mm;

and/or, the recess area has a third parameter b, and a value range of the third parameter b is 90°-135°; and the third parameter b is an included angle between an inner wall surface of the recess area and the bottom of the recess area.

Preferably, the stimulation surface is a curved surface, and a maximum curvature radius R of the curved surface ranges from 5 mm-10 mm.

Preferably, the massage assembly includes:

a driving assembly connected to the massage assembly.

Preferably, the massage elements are one or more of a sphere, a hemisphere, a block, a column, and a tongue-shaped.

Preferably, a number of the massage elements is N, and a value range of N is 1-4.

Preferably, at least in a non-operating state, the massage elements present a visible state, or a partially visible state or an invisible state; and the visible state means that the massage elements are completely displayed in a field of view, the partially visible state means that the massage elements are covered by the flexible surface, and a part of trace is displayed in the field of view, and the invisible state means that the massage elements are covered by the flexible surface and is completed hidden from the field of view.

Preferably, the plug-in massage structure further includes:

humps formed on circumferential wall surfaces of the massage elements; and where the humps are bulged relative to the circumferential wall surfaces of the massage elements, and a value range of a bulge height d is 1 mm-3 mm.

Preferably, the massage elements are arranged in a single row or a single column, or the massage elements are arranged in a plurality of rows and columns.

Preferably, the carrier has a length L3 in an axial direction, and a value range of L3 is 60 mm-150 mm.

Preferably, the massage assembly includes:

the driving assembly connected to the massage elements.

The present disclosure further provides a plug-in massage device, at least including:

a first massage body; and the plug-in massage structure according to any one of the above technical solutions disposed on the first massage body; and the carrier of the plug-in massage structure forms a plug-in end of the first massage body, and the first massage body has a handheld end in a direction away from the plug-in end.

Preferably, the plug-in massage structure further includes:

a second massage body disposed on the first massage body and located on one side of the plug-in massage structure;

where the first massage body may adopt a telescopic structure, a sucking structure, a vibrating structure, or a tapping structure;

and/or the second massage body may adopt a telescopic structure, a sucking structure, a vibrating structure, or a tapping structure.

Preferably, the plug-in massage structure further includes:

stimulation structures disposed on the first massage body and/or the second massage body;

the stimulation structures are at least soft or hard; and the stimulation structures are at least one or more of a sphere, a hemisphere, a block, a column, a tongue-shaped.

Preferably, the first massage body and/or the second massage body have:

an elastic element, where the elastic element is at least configured to allow the first massage body and/or the second massage body to be in flexible contact with the inner cavity of the hole-shaped part to be massaged.

Preferably, the plug-in end of the first massage body at least includes:

a first insertion section and a second insertion section;

where the plug-in massage structure is disposed on the first insertion section;

a diameter of the first insertion section is D2, and a diameter of the second insertion section is D3;

further, D2=K×D3; and a value range of D3 is 20 mm-50 mm, and a value range of K is 0.6-0.9.

The present disclosure provides a plug-in massage structure and a plug-in massage device, which has the following beneficial effects:

First, no matter whether the plug-in massage device is used as the rehabilitation massage device or the sexual massage device, the carrier can allow the massage elements to enter the hole-shaped part to be massaged, such that a massaged region is formed in the cavity of the hole-shaped part to be massaged, thereby ensuring stronger stimulation sensation and effective massage for the part to be repaired.

Second, the massage assembly disposed in the recess area has a larger amplitude of action, and allows the inner cavity tissue to settle into the recess area to form a wrapping state, such that the massage stimulation sensation is further increased without causing massage pain, and psychological and physiological needs of the user are satisfied to a greater extent.

REFERENCE NUMERALS IN THE ACCOMPANYING DRAWINGS

Figure 1:
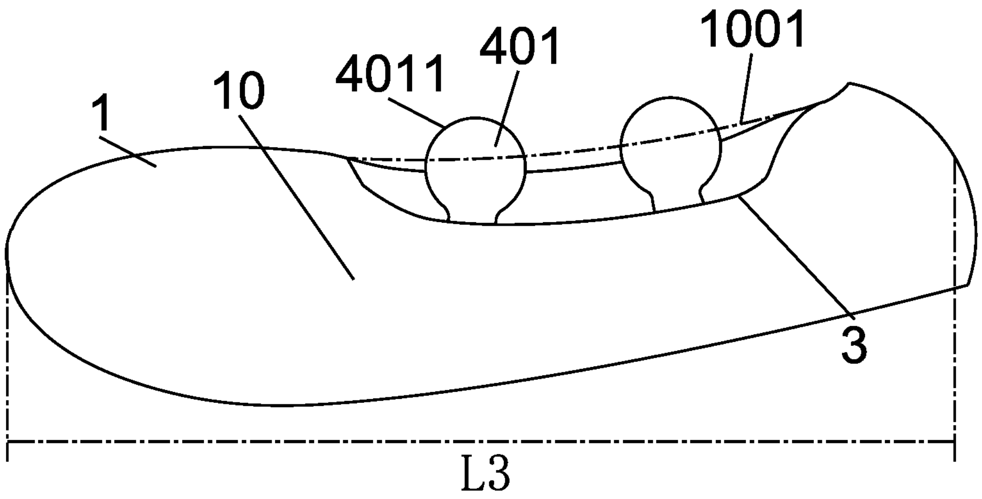
FIG. 1 is a first perspective view of a plug-in massage structure according to the present disclosure (massage elements present a visible state).
Figure 2:
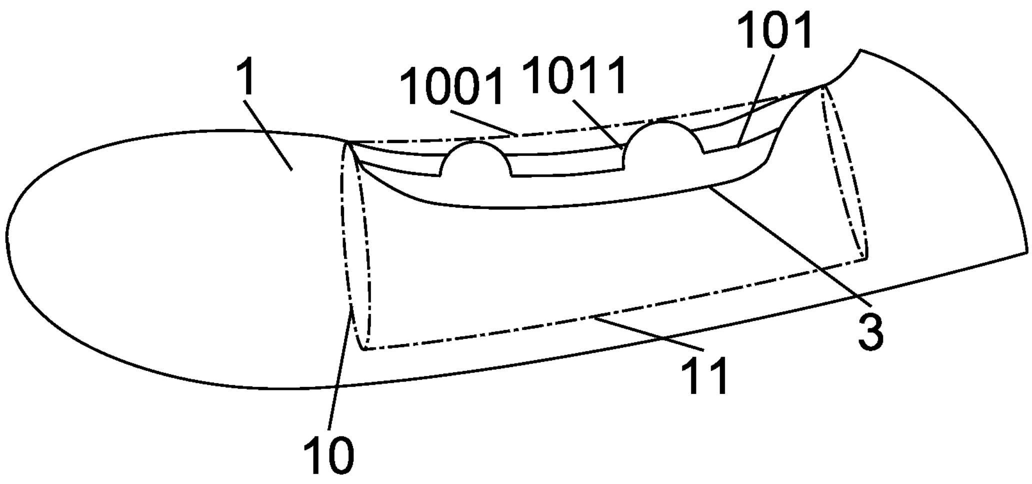
FIG. 2 is a second perspective view of a plug-in massage structure according to the present disclosure (massage elements present a partially visible state).
Figure 3:
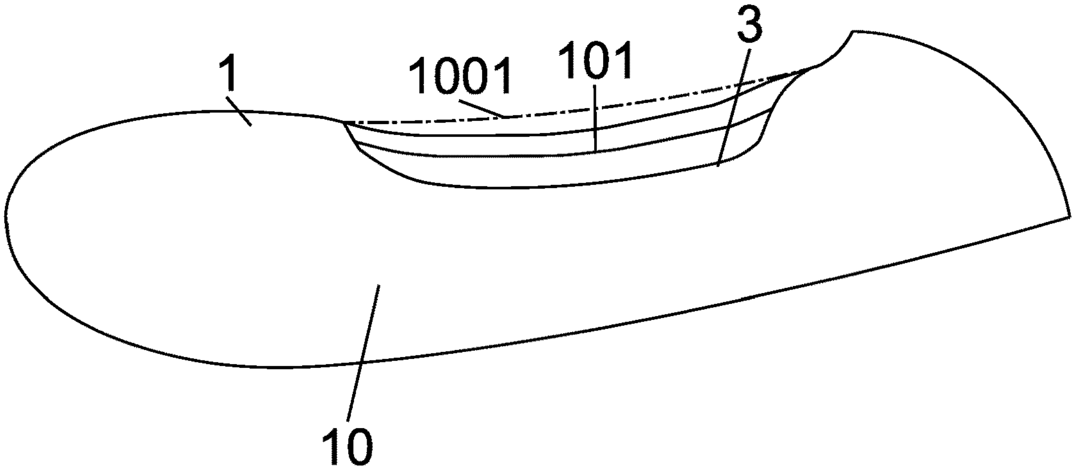
FIG. 3 is a third perspective view of a plug-in massage structure according to the present disclosure (massage elements present an invisible state).
Figure 4:
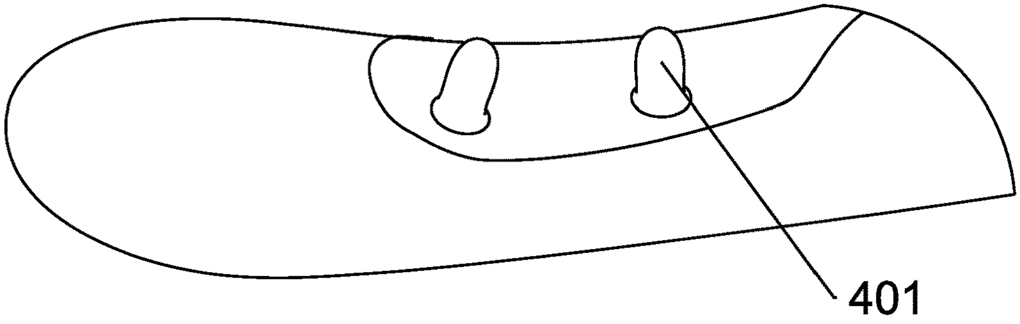
FIG. 4 is a first structural diagram of massage elements in a plug-in massage structure according to the present disclosure (the massage elements are in a finger shape or similar shape).
Figure 5:
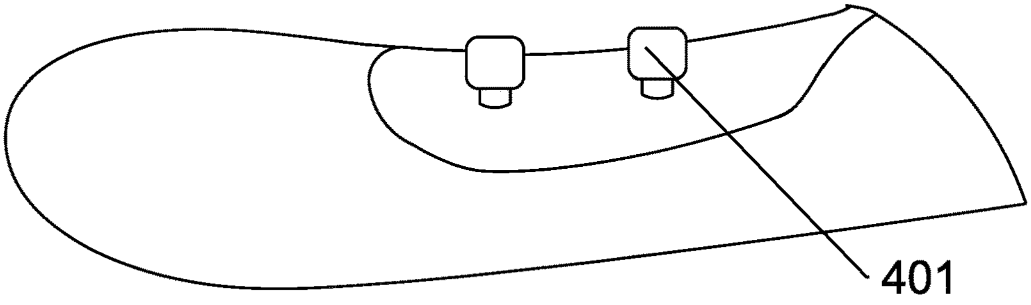
FIG. 5 is a second structural diagram of massage elements in a plug-in massage structure according to the present disclosure (the massage elements are in a block shape or similar shape).
Figure 6:
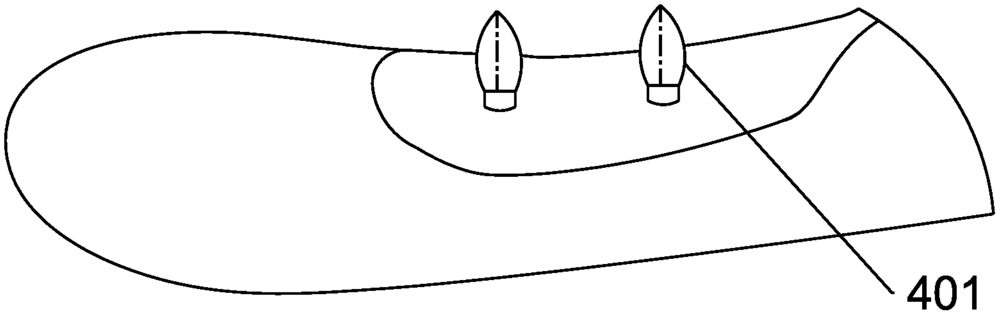
FIG. 6 is a third structural diagram of massage elements in a plug-in massage structure according to the present disclosure (the massage elements are in a tongue shape or similar shape).
Figure 7:
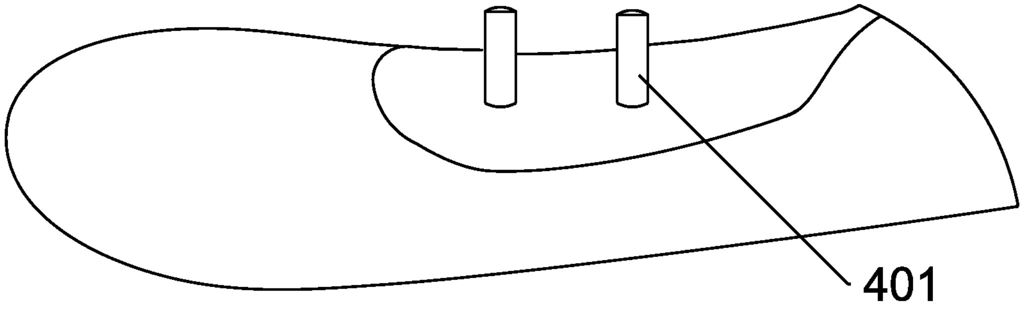
FIG. 7 is a fourth structural diagram of massage elements in a plug-in massage structure according to the present disclosure (the massage elements are in column shape or similar shape).
Figure 8:
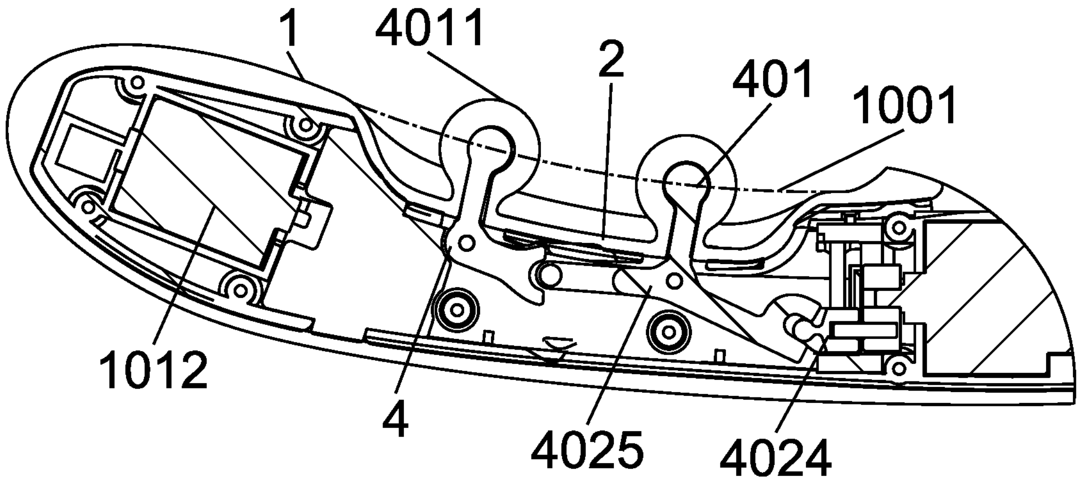
FIG. 8 is a sectional view of a plug-in massage structure according to the present disclosure.

1. carrier; 101. flexible surface; 1011. action area; 1012. electric vibration structure; 2. hole-shaped part to be massaged; 3. recess area; 4. massage assembly; 401. massage element; 4011. stimulation surface; 4012. first massage element; 4013. second massage element; 402. driving assembly; 4021. driving motor; 4022. threaded rod; 4023. threaded sleeve; 4024. swing motor; 4025. swing arm; 4026. lifting motor; 4027. cam; 4028. lifting arm; 5. hump; 10. cylindrical area; 1001. virtual surface region; 11. virtual cylinder; 6. first massage body; 601. handheld end; 602. plug-in end; 6021. first insertion section; 6022. second insertion section; 7. plug-in massage structure; 8. second massage body; and 9. stimulation structure.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

With reference to FIGS. 1-29, specific embodiments provided by the present disclosure are as follows:

As shown in FIGS. 1-22, a first embodiment of the present disclosure provides a plug-in massage structure, at least including:

- a carrier 1 having a cylindrical area 10 and a recess area 3, where the carrier 1 can be fully inserted into a hole-shaped part to be massaged 2;
- where the cylindrical area 10 is an approximately cylindrical structure matched with an inner cavity of the hole-shaped part to be massaged 2;
- where the recess area 3 has a tunnel-type recess structure opposite to a virtual cylinder 11;
- where the virtual cylinder 11 is a virtual cylindrical structure formed by the cylindrical area 10 maintaining its cylindrical end surface and extending to the recess area 3;
- where a depth of the recess area 3 is M, and M is a height of a tunnel center line of the tunnel-type recess structure;
- a massage assembly 4 having massage elements 401 disposed in the recess area 3; and
- the massage elements 401 each has a degree of freedom A in the recess area 3.

In the prior art, a massage wand capable of being inserted into the hole-shaped part to be massaged 2 is available, however, the massage wand in this form has the following problems:

- first, a plug-in section of the massage wand usually provides extending and retracting, vibration or similar massage actions, but it is more prone to perform massage actions in relatively limited area, therefore, it is difficult to provide strong stimulation sensation to an wall surface of the inner cavity;
- second, when a massage structure is disposed on a circumferential wall surface of the massage wand, the above problem can be solved, that is, a certain wall surface of the inner cavity can have strong massage sensation, but relatively strong pain will be caused during inserting and massage stages, even tearing wounds may be caused. Moreover, a wrapping effect of inner cavity tissue will cause greater resistance to the massage structure, so that the degree of freedom of the massage structure is forcibly reduced, thereby reducing the massage effects.

Based on this situation, this embodiment makes optimization of the carrier 1.

The plug-in massage structure has the cylindrical area 10, which should be understood that the cylindrical area is an approximately cylindrical structure matched with the inner cavity of the hole-shaped part to be massaged 2, such as a cylindrical shape, a quasi-cylindrical shape, or a square column shape with rounded corners.

The cylindrical area 10 can be completely inserted into the hole-shaped part to be massaged 2, and the recess area 3 is driven to be synchronously inserted into the above-mentioned part. The cylindrical area 10 has a front section, a middle section, and a rear section. The recess area 3 may be disposed at any one of the sections, preferably, it may be disposed at a position close to the rear section, so that another set of massage structures may be disposed inside the front section. For example, the front section may be set as an electric telescopic structure or an electric vibration structure 1012, which may refer to a related massage structure in the prior art.

The recess area 3 is a tunnel-type recess structure opposite to the virtual cylinder. It should be understood that, the recess area 3 is integrally formed on the basis that an original radial dimension of the carrier 1 is not changed, so that the carrier 1 forms a concave area in the recess area for installation of the massage assembly 4.

The massage assembly 4 is disposed in the recess area 3, and the massage elements 401 of the massage assembly each has a degree of freedom in the recess area 3. Specifically, the degree of freedom allows the massage elements 401 to perform a massage action.

The massage action is a reciprocating linear movement in a length direction or a width direction of the recess area 3, and the massage elements 401 stimulate and massage the inner hole-shaped part to be massaged 2 through the massage action.

The massage action is a reciprocating linear movement in a depth direction of the recess area 3, and the massage elements 401 support the inner cavity according to this action to implement massage and stimulation.

The massage action may be a swing movement in the length direction or the width direction of the recess area 3, and provides massage and stimulation through the massage action. Preferably, the massage element 401 includes a first massage element 4012 and a second massage element 4013; when the first massage element 4012 and the second massage element 4013 perform swing actions in opposite directions, massage stimulation effects of kneading can be produced to a vaginal cavity.

Due to the existence of the recess area 3, it can be foreseeable that:

- first, the degree of freedom of the massage elements 401 on the carrier 1 is further improved, specifically, the recess area 3 increases the degree of freedom of the massage elements 401 in a radial direction of the carrier 1, thereby ensuring that the massage elements 401 are likely to produce greater massage effects, for example, the massage action in a plurality of directions can be realized to improve the massage effects and stimulation sensation.

Second, the recess area 3 allows the inner cavity tissue to settle to form a package around the massage element 401, so that when the massage element 401 performs the massage action, stronger stimulation effects can be produced for the inner cavity, a bigger and more dynamic massaged region is radiated, thereby ensuring that the stimulation sensation is further improved.

It should be noted that there is an essential difference between a plug-in massage form and a non-plug-in massage form provided in this embodiment, and the massage assembly 4 is completely inserted into the hole-shaped part to be massaged 2 through the carriage of the carrier 1, so that the massage assembly 4 is capable of more directly acting on a part to be repaired, and the massage action is performed to promote the repair effect of the part to be repaired, thereby improving the rehabilitation effect.

Since the recess area 3 is recessed by a certain depth M in the radial direction of the carrier 1, when the massage element 401 performs the massage action, a certain action space is provided for the massage element 401, and an increase in the action space means that the massage element 401 has a higher degree of freedom. When the massage element 401 is located in the recess area 3 for massage stimulation, it can be found that:

- first, part of the structure of the massage element 401 (part of a wand body or all of the wand body of the massage element 401) is hidden in the recess area 3, and when a length of the massage element 401 is fixed, comparing the massage element 401 (shorted as "a former" below) assembled in the recess area 3 with the massage element 401 (shorted as "a latter" below) assembled on a circumferential wall surface of the carrier 1:
- the former causes a smaller degree of arching of the hole-shaped part to be massaged 2 of a female, that is, an amount of deformation forced on the hole-shaped part to be massaged 2 is smaller, which means that less injury to the hole-shaped part to be massaged 2 when the carrier 1 is inserted into the hole-shaped part to be massaged 2 and during the massage stage after the carrier is inserted into the same, so that secondary injury to the hole-shaped part to be massaged 2 is avoided; while the latter causes a greater degree of arching of the hole-shaped part to be massaged, which will inevitably cause injury to an inner wall of the hole-shaped part to be massaged during the inserting and massage stages of the carrier 1, and is not conducive to the female's postpartum recovery;
- second, when the massage element 401 has a certain degree of arching of the hole-shaped part to be massaged 2, comparing the massage element 401 (shorted as "the latter" below) assembled on the circumferential wall surface of the carrier 1 with the massage element 401 (shorted as "the former" below) assembled in the recess area 3:
- a length of the former can be adjusted to be longer, and a swing length of the massage element becomes longer when the massage element 401 performs the massage action, especially when a swing massage action is performed, such that the massaged region radiated by the massage elements is larger. While the latter has a relatively short length, the massaged region radiated thereby is smaller when the massage action is performed, especially when a swing action is performed, so that the massage effects are weakened.

As a sexual massage device, it can be foreseeable that when the carrier 1 is inserted into the hole-shaped part to be massaged 2 (a vagina), and the massage element 401 in the recess area 3 is synchronously inserted into the vagina, the massage element 401 performs a linear massage action, a swing action or a lifting movement due to the degree of freedom. However, regardless of the type of massage movement, the massage element 401 can provide relatively strong stimulation sensation to an inner wall of the vagina, and further, the existence of the recess area 3 enables the massage element 401 to have a greater degree of freedom in the massage action, such that stimulation sensation that is obviously different from that of the prior art is exerted on the inner wall of the vagina.

A specific use process of the plug-in massage device is: a user holds one end of the carrier 1 and gradually inserts the other ends into the vagina, and after the massage element 401 located in the recess area 3 is completely inserted into the vagina, a driving structure of the massage element 401 can be started, such that the massage element 401 performs the massage action inside the vagina. The carrier 1 can also be configured as a massage structure to exert stimulation sensation on the inner wall of the vagina in a thrusting form, so as to cooperate with the massage action of the massage element 401 to provide strong stimulation effects to the user.

On the basis of the above, a massage mode of the massage element 401 is further defined.

The massage element 401 can be in direct contact with an inner wall surface of the hole-shaped part to be massaged 2, that is, a circumferential wall surface of the massage element serves as a massage surface to massage and stimulate the hole-shaped part to be massaged. Specifically, the massage element 401 can be made hard material or soft material, or hard material wrapped with soft material, such that different materials of the massage element 401 can be selected to meet different requirements.

In such a way, the massage elements 401 are in close contact with the hole-shaped part to be massaged 2, the massage elements 401 can be thus wrapped or partially wrapped with skin or tissue of the hole-shaped part to be massaged 2, and when the massage action is performed, a direct massaged region radiated by the massage elements 401 is larger, the user can feel stronger stimulation sensation, which is conducive to the recovery of the hole-shaped part to be massaged 2 and application of sexual stimulation sensation.

Further, the massage surface and the hole-shaped part to be massaged 2 have a relative movement, that is, in a movement process of the massage element 401, the circumferential wall surface of the massage element and the inner wall surface of the hole-shaped part to be massaged generate relatively sliding friction, such that the massage effects and sexual stimulation sensation are improved.

Alternatively, the massage element 401 can be in indirect contact with the inner wall surface of the hole-shaped part to be massaged 2, that is, a flexible surface 101 can be driven to deform to act on the massaged region. Specifically, the flexible surface 101 may be wrapped on a wall surface of a flexible layer on the circumferential wall surface of the carrier 1, a wall surface of the flexible surface facing outwards (a visible wall surface) is in contact with an inner wall of the plug-in massage structure, and a wall surface facing inwards (an invisible wall surface) is in contact with circumferential wall surface of the massage element 401; and when the massage element 401 performs the massage action, massage stimulation effects are produced driving the wall surface of the flexible layer to generate deformation.

Further, in such a way, no relative sliding occurs between the massage surface and the hole-shaped part to be massaged 2, merely the massage element 401 drives the flexible layer to deform to product massage and stimulation effects, such that relatively mild massage stimulation is achieved and secondary injury to the wound is avoided.

On the basis of the above, at least in a non-operating state, the massage elements 401 present a visible state, or a partially visible state or an invisible state; and specifically, the visible state means that the massage elements 401 are completely displayed in a field of view, the partially visible state means that the massage elements 401 are covered by the flexible surface 101, and a part of trace is displayed in the field of view, and the invisible state means that the massage element 401 is covered by the flexible surface 101 and is completed hidden from the field of view.

This embodiment defines the non-operating state, that is, the massage elements 401 do not perform the massage action and is a state at an initial position.

As described above, since the circumferential wall surface of the massage elements 401 can be directly used as the massage surface to be in contact with the hole-shaped part to be massaged 2, the massage element 401 in a fully displayed state, that is, from a visible perspective, the massage element 401 is obviously independent from the carrier 1 or the recess area 3, the massage elements 401 are independent structures and appear in the recess area 3, and no obstruction exists around the massage elements, such that the massage elements can form a direct contact after entering the hole-shaped to-be-massaged part 2.

Further, the massage elements 401 can be covered by the flexible surface 101, and the flexible surface 101 can be a flexible layer that is completely wrapped around the circumferential wall surface of the carrier 1, or a flexible layer covering the recess area 3. The massage action of the massage elements 401 can force the flexible surface 101 to deform to achieve the massage stimulation effect.

Specifically, the massage elements 401 can display the part of trace in an initial state, for example, when the flexible surface 101 forms a slight bulge or protrusion, the flexible surface 101 exerts a certain flexible constraint force on the massage element 401; and when the massage element 401 performs the massage action, the part of trace of the massage element becomes more obvious, that is, an amount of deformation of the flexible surface 101 gradually increases, thereby achieving the massage stimulation effects.

Alternatively, after the massage elements 401 are covered by the flexible surface 101, the massage elements 401 do not display any trace, that is, the flexible constraint force between the flexible surface 101 and the massage elements 401 is 0. In this case, the massage action of the massage elements 401 causes the flexible surface 101 to deform to achieve the massage stimulation effects.

The reason for setting the above three presentation forms is that degrees of injury suffered by female from childbirth are different. For the female with higher degree of injury, the massage elements 401 covered by the flexible surface 101 to display or not display the trace can be adopted, both of which can produce more gentle stimulation effects and are less likely to cause secondary injury, and further, the massage action of the massage elements 401 is constrained by the flexible surface 101, such that the problem of secondary tearing of the wound caused by greater massage amplitude can be avoided. For the female with lower degree of injury, the massage elements 401 completely displayed can be adopted, which produces greater massage effects, the massage elements 401 are not constrained, and the action amplitude of the massage elements is relatively great, such that a greater degree of stimulation can be formed to accelerate the repair progress. Further, when the massage structure serves as a sexual massage device, degrees of vaginal relaxation and perception of sexual stimulation of the female are different, the foregoing three presentation forms can be selected. For example, for a woman with a relatively loose vagina, the massage elements 401 in the visible state or the partially visible state can be adopted, in these states, the massage elements 401 may provide a certain friction stimulation to the inner wall of the vagina during the inserting stage of the carrier 1, such that sexual stimulation experience of the user can be improved; and when the carrier 1 performs a thrusting action, the massage elements 401 can exert greater elastic deformation force on the inner wall of the vagina, such that the sexual stimulation sensation is improved. For a woman with a relatively tighter vagina, the massage elements 401 displayed the invisible state can be adopted, in the state, the massage elements 401 will not excessively strut the vagina during the inserting stage of the carrier 1, such that tearing pain of the vagina is reduced; and after the carrier 1 is inserted, stronger stimulation sensation can be achieved due to the thrusting action of the carrier 1 and the massage action of the massage elements 401.

Of course, the foregoing three presentation forms can provide stimulation sensation to varying degrees, therefore, the user can select the form based on desired stimulation effects.

Further, the flexible surface 101 at least covers the recess area 3, and the massage elements 401 are located between the flexible surface 101 and the recess area 3.

In this embodiment, as described above, the flexible surface 101 at least needs to cover the recess area 3, such that the massage elements 401 are located between the recess area 3 and the flexible surface 101.

The flexible surface 101 exerts the constraint force on the massage elements 401, so as to case the massage action amplitude to a certain extent.

Further, the amount of deformation of the flexible surface 101 is positively correlated with the massage effects. Specifically, the smaller the amount of deformation of the flexible surface 101 is, that is, it is more difficult to generate the deformation, the greater the flexible constraint force exerted on the massage elements 401 becomes, and in this case, the stimulation effects of the massage elements 401 will be weakened. The greater the amount of deformation of the flexible surface 101 is, that is, it is easier to generate the deformation, the smaller the flexible constraint force exerted on the massage elements 401 becomes, and in this case, the stimulation effects of the massage elements 401 will be increased.

Therefore, the material of the flexible surface 101 can be selected based on the desired stimulation effects.

Further, a thickness of the flexible surface 101 also affects the massage effects. Specifically, the smaller the thickness of the flexible surface 101 is, the higher a protruding degree of the massage elements 401 on the flexible surface 101 becomes, and more significant the stimulation massage effects produced by the massage elements become. On the contrary, the greater the thickness of the flexible surface 101 is, the lower the protruding degree of the massage elements 401 on the flexible surface 101 becomes, and the milder massage stimulation effects produced by the massage elements become. Therefore, the thickness of the flexible surface 101 can be selected based on the desired stimulation effects. Preferably, the thickness of the flexible surface 101 ranges from 2 mm to 5 mm.

On the basis of the above, the carrier 1 is wrapped by the flexible surface 101;

where the flexible surface 101 forms an action area 1011, and the massage elements 401 cause the action area 1011 to deform.

In this embodiment, the carrier 1 may be wrapped by the flexible surface 101, that is, the flexible surface may be used as a surface layer with elastic property of the carrier 1. In this case, the action area 1011 formed on the flexible surface 101 is the portion located in the recess area 3, and the massage elements 401 cause the flexible layer to deform in the recess area 3.

On the basis of the above, relationships between the flexible surface 101 and the recess area 3 include two types:

- first, the flexible surface 101 is attached to all groove surfaces of the recess area 3 according to a forming path of the recess area 3, and in this case, the massage elements 401 display as a bulge or a protrusion on the flexible surface 101, or is hidden on a bottom surface of the recess area 3 and is not in contact with the flexible surface 101 (in contact with the flexible surface 101 merely in a massage state); and
- second, the flexible surface 101 covers a notch of the recess area 3, and the massage elements 401 are disposed in the recess area 3, or the massage elements 401 display as the bulge or the protrusion on the flexible surface 101.

As shown in FIGS. 1-19, a second embodiment of the present disclosure provides a plug-in massage structure, the massage elements 401 each at least has a stimulation surface 4011 capable of interacting with the inner cavity of the hole-shaped part to be massaged 2;

- where generation of effects is controlled by actions of the massage elements 401 allowed by the degree of freedom;
- where the effects include at least touch pressure effect that form a point-like area in the inner cavity of the hole-shaped part to be massaged 2.

In this embodiment, the massage elements 401 may be in the form of a sphere, a hemisphere, or a semi-ring, and the stimulation surface 4011 is formed on the circumferential wall surface of the massage elements. When the massage assembly 4 performs an action, the stimulation surface 4011 acts on the inner cavity of the hole-shaped part to be massaged.

It is further found that a degree of stimulation felt by the human body is related to a shape of the action area 1011. Specifically, when the action area 1011 is large, stimulation sensation of the human body is relatively weak, that is, although the massaged region is increased, the stimulation sensation of the human body is gradually weakened due to influence of subjective consciousness, with an increase in action time. On the contrary, when the action area 1011 is small, the stimulation sensation of the human body is relatively strong, and from the perspective of the subjective consciousness, the human body considers that a dot-like massage produces a stronger stimulation feeling than a large-area massage.

Based on this, this embodiment expects that the stimulation surface 4011 produces touch pressure effects of the point-like area. Specifically, when the massage action is performed, a contact area between the stimulation surface 4011 and the inner cavity is relatively small, although a surface-to-surface contact is formed, such contact is more similar to a point-to-surface contact at a microscopic level, such that the stimulation sensation of the human body is improved, and the stimulation sensation is stronger. Further, in cooperation with different types of massage actions above, the point-like area is dynamic, especially when the swing action is performed, and the massage effects are improved.

Figure 9:
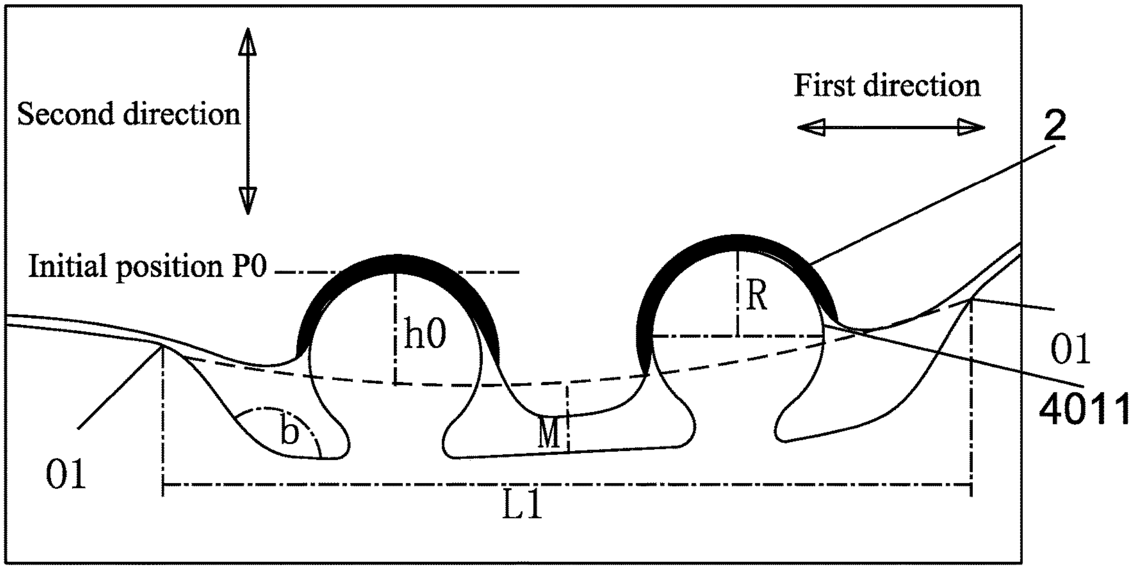
FIG. 9 is a schematic diagram of massage elements in a plug-in massage structure according to the present disclosure are in an initial position.
Figure 10:
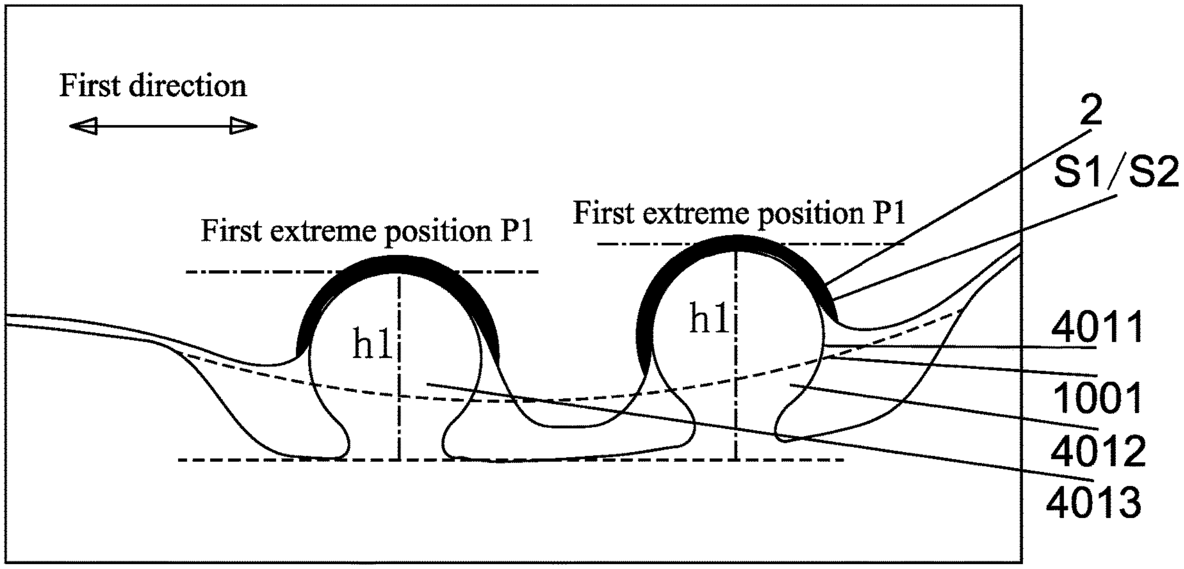
FIG. 10 is a schematic diagram of a first extreme position P1 when massage elements in a plug-in massage structure according to the present disclosure is in a first direction.
Figure 11:
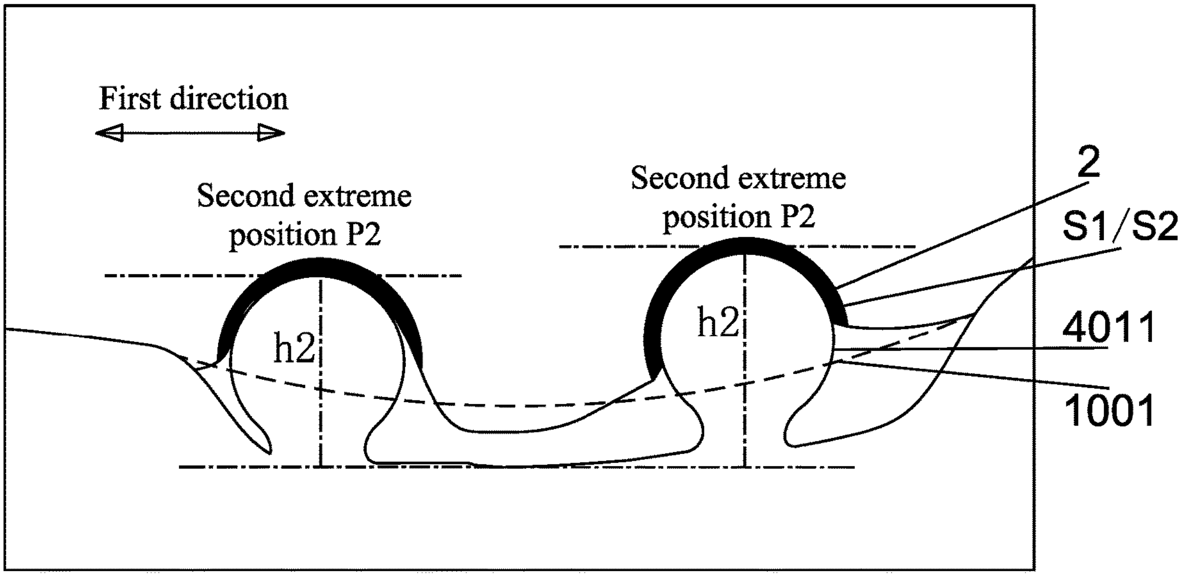
FIG. 11 is a schematic diagram of a second extreme position P2 when massage elements in a plug-in massage structure according to the present disclosure is in a first direction.
Figure 12:
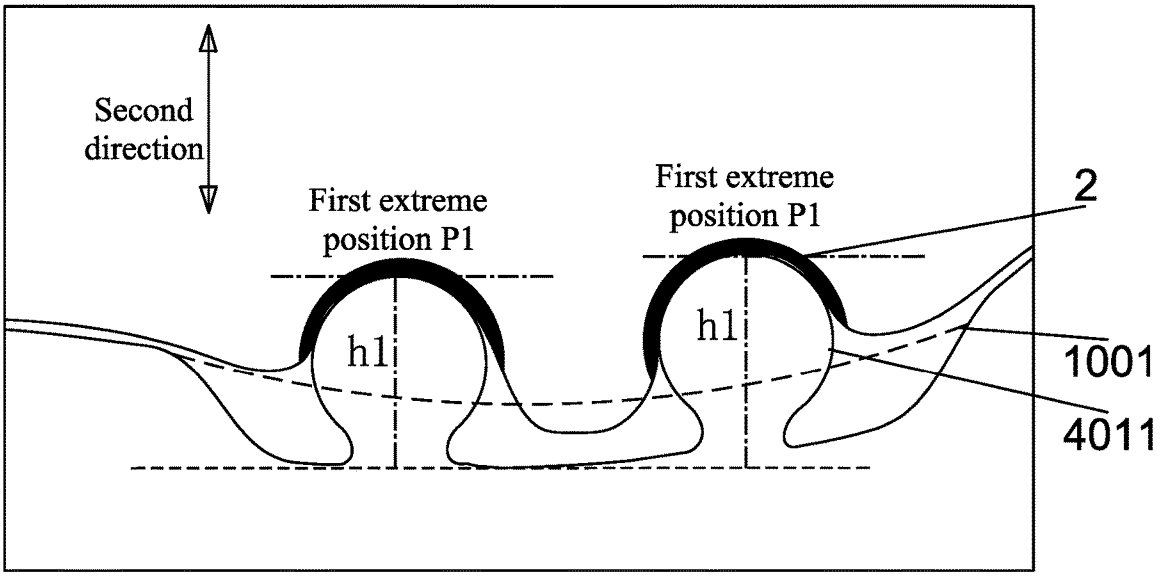
FIG. 12 is a schematic diagram of a first extreme position P1 when massage elements in a plug-in massage structure according to the present disclosure is in a second direction.
Figure 13:
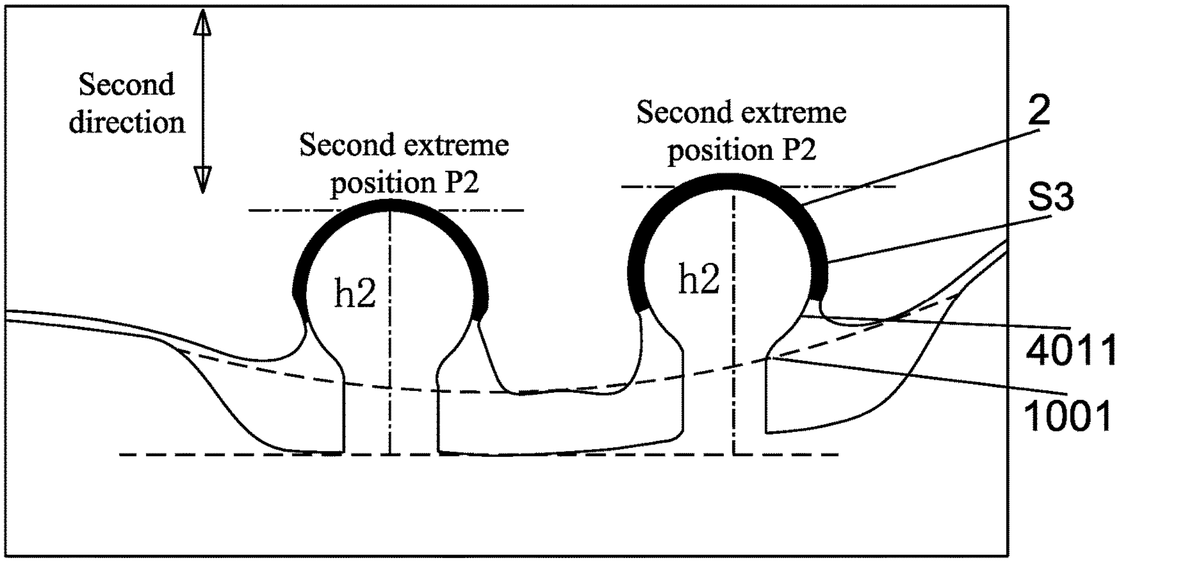
FIG. 13 is a schematic diagram of a second extreme position P2 when massage elements in a plug-in massage structure according to the present disclosure is in a second direction.
Figure 14:
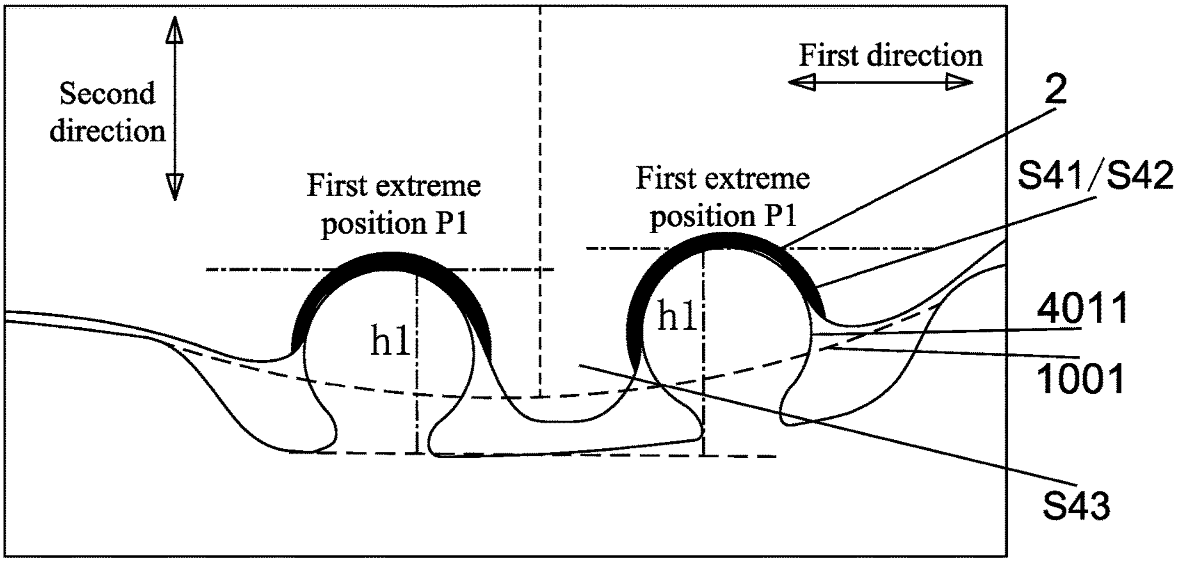
FIG. 14 is a schematic diagram of a first extreme position P1 when massage elements in a plug-in massage structure according to the present disclosure is in a first direction and a second direction.
Figure 15:
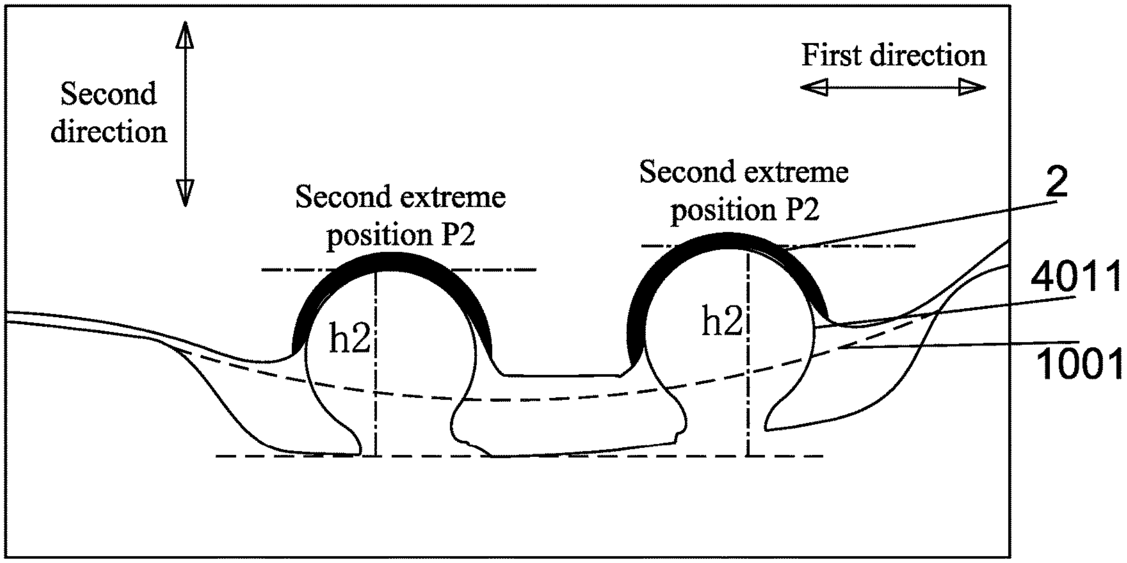
FIG. 15 is a schematic diagram of a second extreme position P2 when massage elements in a plug-in massage structure according to the present disclosure is in a first direction and a second direction.
Figure 16:
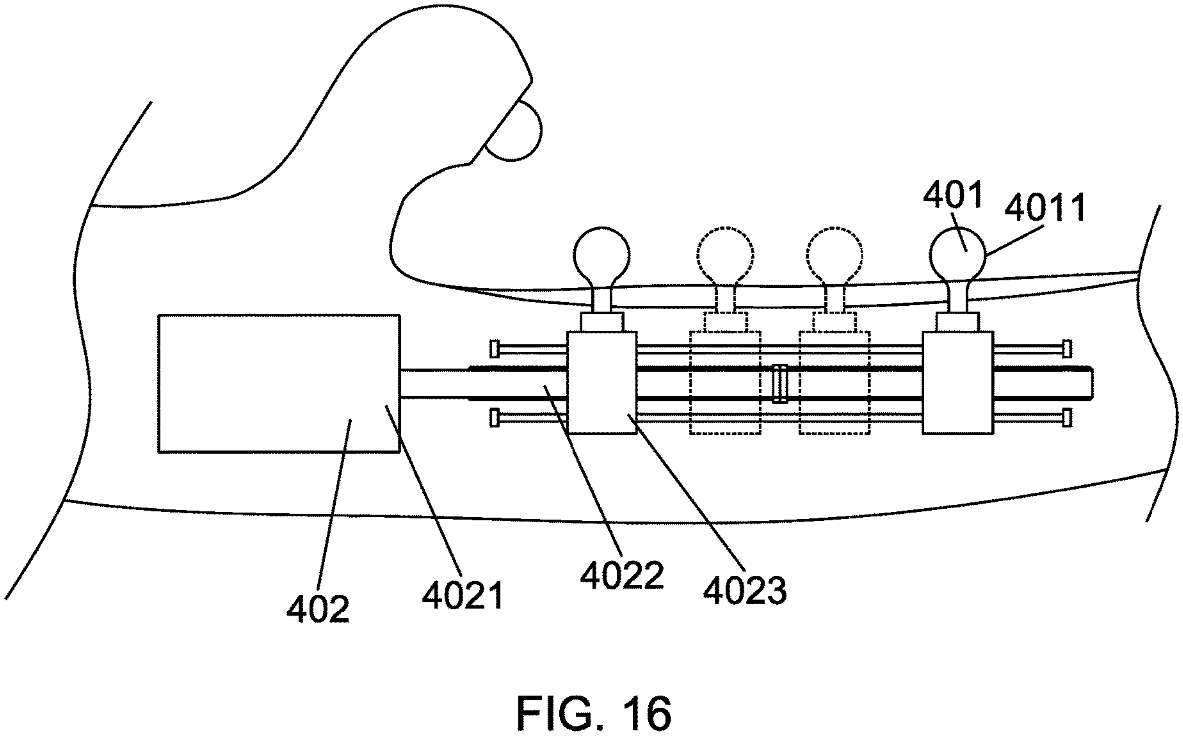
FIG. 16 is a first structural schematic diagram of a driving assembly in a plug-in massage structure according to the present disclosure, in which the driving assembly drives massage elements to move in a first direction (two massage elements move relative to each other).
Figure 17:
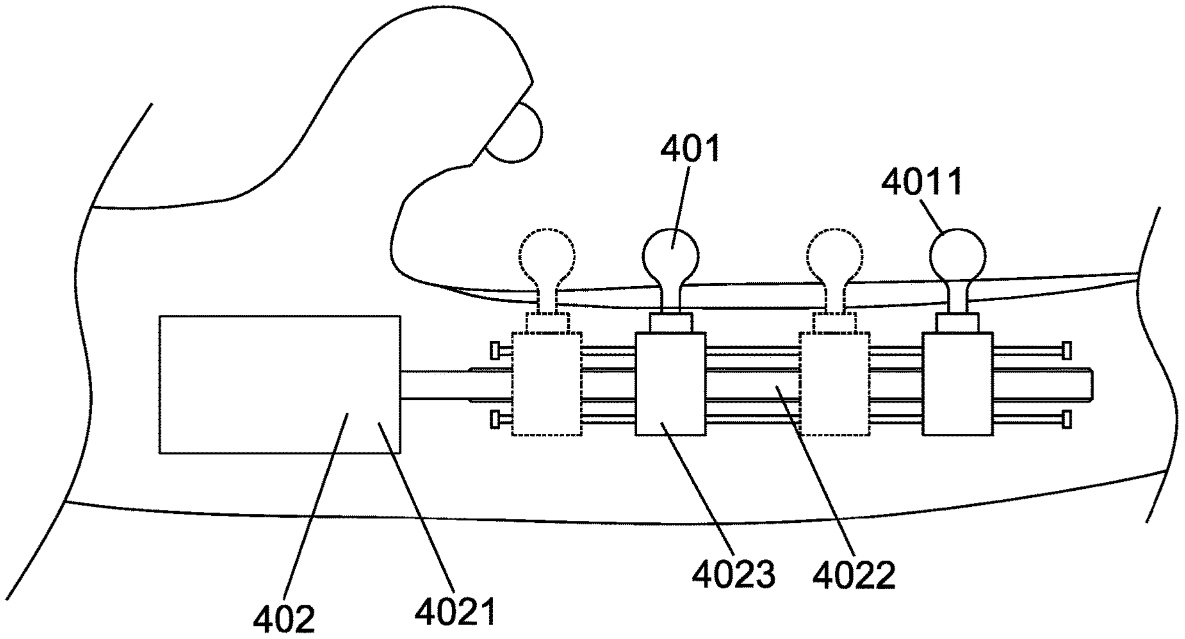
FIG. 17 is a second structural schematic diagram of a driving assembly in a plug-in massage structure according to the present disclosure, in which the driving assembly drives massage elements to move in a first direction (two massage elements move in a same direction).
Figure 18:
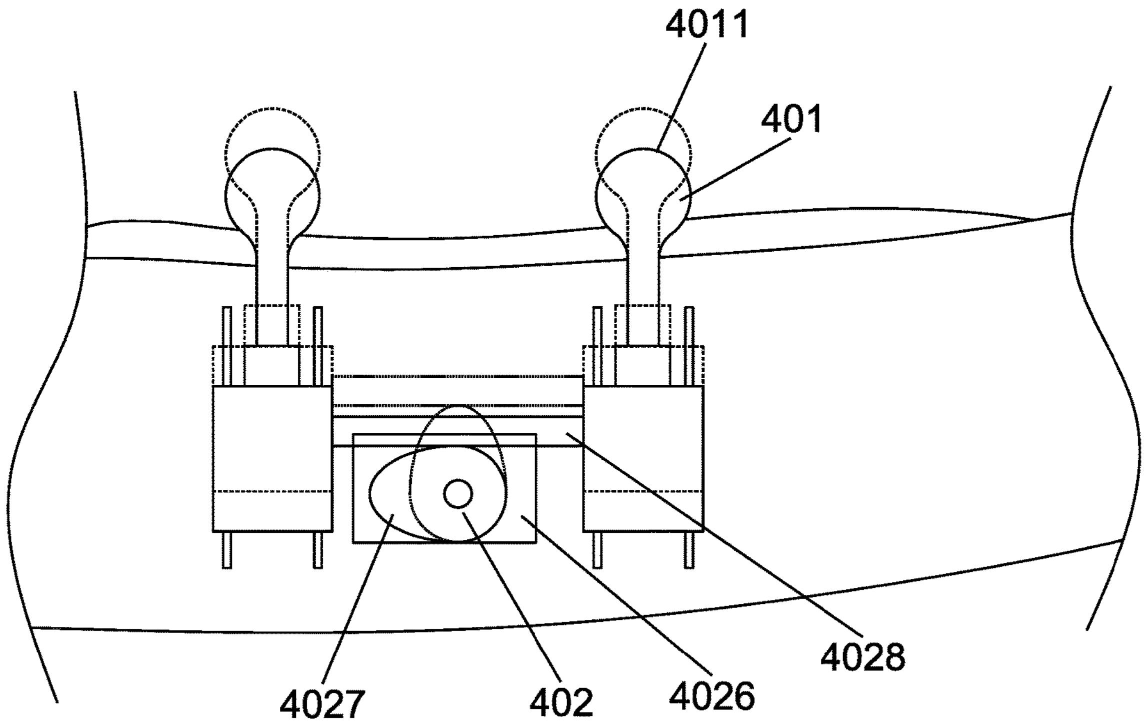
FIG. 18 is a structural schematic diagram of a driving assembly in a plug-in massage structure according to the present disclosure, in which the driving assembly drives massage elements to move in a second direction.

As shown in FIG. 9, a third embodiment of the present disclosure provides a plug-in massage structure, and the stimulation surface 4011 has at least an initial position P0;

- where the initial position P0 is a position of the stimulation surface 4011 in an initial state;
- the initial state is a state that is not controlled by an action of the degree of freedom; and
- where the stimulation surface 4011 at the initial position P0 has a height h0, and the height h0 is a maximum value of a vertical distance from a center of the stimulation surface 4011 of the degree of freedom to a bottom of the recess area 3.

In this embodiment, the stimulation surface 4011 has an initial position P0, that is, when the massage element 401 is installed, the stimulation surface 4011 is at the initial position P0.

Further, as described above, since consideration has been given to the radial dimension of the carrier 1 during the inserting and massage stages, massage pain caused by greater stretching force on the inner cavity during the two stages is avoided.

Based on this, the height h0 of the initial position P0 is defined, that is, a value range of h0 is 1 mm-5 mm. Within the range, it is found that when the carrier 1 is at the inserting stage, it can be ensured that the massage elements 401 can enter smoothly without being greatly hindered, and the massage elements 401 can further provide a certain support to the inner cavity when no massage action is performed, such that the massage elements deform and produce a certain degree of stimulation.

As shown in FIGS. 10-15, a fourth embodiment of the present disclosure provides a plug-in massage structure, which is controlled by the degree of freedom to enable the stimulation surface 4011 to have a first extreme position P1;

- the first extreme position P1 is a one maximum displacement position of the stimulation surface 4011 within an allowable stroke section of the degree of freedom A; and
- the stimulation surface 4011 at the first extreme position P1 has a height h1, and the height h1 is the maximum value of the vertical distance from the center of the stimulation surface 4011 of the degree of freedom to the bottom of the recess area 3.

In this embodiment, the stimulation surface 4011 further has the first extreme position P1. Specifically, when the massage elements 401 perform the swing action, the first extreme position P1 is a lowest swing point. When the massage elements 401 perform the reciprocating movement in the depth direction of the recess area 3, the first extreme position P1 is a lowest point of descent. When the massage elements 401 perform the reciprocating movement in the length or width direction of the recess area 3, the first extreme position P1 is a closest position to a boundary line of the recess area 3.

On the basis of the above, when the position of the stimulation surface 4011 changes merely in a second direction, that is, the massage elements 401 perform the reciprocating movement in the depth direction of the recess area 3, 1 mm≤h1−M≤2 mm.

Specifically, the massage elements 401 perform the lifting movement, and an area of a massaged region S3 radiated thereby is relatively small. However, the massage elements 401 continuously exert radial force of the carrier 1 on the hole-shaped to-be-massaged part 2, such that the amount of deformation of the massage elements may be higher, thereby providing the stronger stimulation sensation.

In this form, a driving assembly 402 includes a lifting motor 4026, a cam 4027 connected to the lifting motor 4026, and a lifting arm 4028 abutting against the cam 4027, and the lifting arm 4028 connected to the massage elements 401. The lifting motor 4026 drives the cam 4027 to rotate, and the lifting arm 4028 is then intermittently lifted, such that a lifting process of the massage elements 401 is implemented. Since there are many mechanisms for providing the lifting process in the prior art, details will not be described herein.

When the position of the stimulation surface 4011 changes merely in a first direction, that is, the massage elements 401 perform the reciprocating movement in the length or width direction of the recess area 3, 1 mm≤h1−M≤5 mm.

Specifically, one massage element 401 can perform the reciprocating linear movement in the recess area 3, and radiate a massaged region S1 in a movement path thereof, and an area of the massaged region S1 is relatively fixed, and receives a relatively single degree of stimulation sensation. Alternatively, a plurality of massage elements 401 can perform same actions or perform an action in a same direction in the recess area 3, and in this case, the massaged region S1 can feel stimulation at a plurality of points at a same time node, such that the degree of stimulation sensation is increased.

In this form, the driving assembly 402 can include a driving motor 4021, a threaded rod 4022 connected to the driving motor 4021, and a threaded sleeve 4023 screwed on the threaded rod 4022. One or more massage elements 401 are connected to the threaded sleeve 4023 (a through groove is formed on the bottom surface of the recess area 3 for facilitating the connection the massage elements and the threaded sleeve), and the driving motor 4021 drives the threaded rod 4022 to rotate, such that the threaded sleeve 4023 is driven to drive the massage elements 401 to perform the reciprocating linear movement. Of course, this structure is merely one of the specific structures provided in this embodiment, and since there are many mechanisms for the reciprocating linear movement in the prior art, details will not be described herein.

In another form, the massage elements 401 perform the reciprocating movement in the width direction, that is, a second direction, of the recess area 3. The specific principle and beneficial effects thereof are the same as those in the foregoing form, and will not be described in detail herein. Differences thereof lie in that a direction of a massaged region S2 is consistent with the width direction of the recess area 3, and since the movement stroke of the massage elements 401 is shorter, an action frequency of the massage elements is relatively improved, such that the stronger stimulation sensation can be provided.

When the position of the stimulation surface 4011 changes both in the first and second directions, that is, the massage elements 401 perform the reciprocating movement, 0.3 mm≤h1−M≤2 mm.

In this form, a massaged region S41 radiated by the one massage element 401 is an area contacted by an end of the massage element 401 when it swings. Since a swing path of the end of the massage element 401 is an arc, when a relative position between the massage element and the hole-shaped part to be massaged changes, the massage element will accordingly suffer deformation to varying degrees, such that the degree of stimulation sensation is increased.

When the plurality of massage elements 401 swing, stimulation sensation exerted on a massaged region S42 radiated by each of the massage elements 401 is the same as or similar to that on the massaged region S41, and differences lie in that a massaged region S43 is further formed between the massaged region S42 of adjacent massage elements 401, and the massaged region S43 will be kneaded by the adjacent massage elements 401, such that the degree of stimulation sensation is further increased.

Of course, in this form, the driving assembly 402 includes a swing motor 4024, and a swing arm 4025 connected to the swing motor 4024, and the swing arm 4025 is connected to the massage elements 401, where the swing arm 4025 is hinged to an insider of the carrier 1, and the swing motor 4024 drives the swing arm 4025 to swing, so as to drive the massage elements 401 to perform the swing action (the opposite swing is a kneading action). Since swing mechanisms are mature in the prior art, details will not be described herein.

The above process provides a plurality of action forms of the massage elements 401, but no matter which action form is selected, and the recess area 3 can provide a certain degree of freedom for the massage elements 401 to reduce a constraint on the massage elements 401, such that that the massage element can perform the massage action more strongly.

As shown in FIGS. 10-15, a fifth embodiment of the present disclosure provides a plug-in massage structure, which is controlled by the degree of freedom to enable the stimulation surface 4011 to have a second extreme position P2;

- the second extreme position P2 is the other maximum displacement position of the stimulation surface 4011 within the allowable stroke section of the degree of freedom; and
- the stimulation surface 4011 at the second extreme position P2 has a height h2, and the height h2 is the maximum value of the vertical distance from the center of the stimulation surface 4011 of the degree of freedom to the bottom of the recess area 3.

In this embodiment, the stimulation surface 4011 further has the second extreme position P2. Specifically, when the massage elements 401 perform the swing action, the second extreme position P2 is a highest swing point. When the massage elements 401 perform the reciprocating movement in the depth direction of the recess area 3, the second extreme position P2 is a highest point of ascent. When the massage elements 401 perform the reciprocating movement in the length or width direction of the recess area 3, the second extreme position P2 is a closest position to a boundary line of the recess area 3.

On the basis of the above when the position of the stimulation surface 4011 changes merely in the first direction, 1 mm≤h2−M≤5 mm;

- when the position of the stimulation surface 4011 changes merely in the second direction, 3.5 mm≤h2−M≤6 mm;
- when the position of the stimulation surface 4011 changes both in the first and second directions, 2.5 mm≤h2−M≤25 mm.

The demonstration of the foregoing parameter ranges is as described above, and will not be described in detail herein.

As shown in FIG. 9, a sixth embodiment of the present disclosure provides a plug-in massage structure, and a value range of the depth M of the recess area 3 is 8 mm-20 mm;

- and/or, the recess area 3 has a first parameter L1, and a value range of the first parameter L1 is 20 mm-100 mm;
- where the first parameter L1 is a maximum axial distance between two extreme distal centers 01 of the recess area 3 away from a center of the virtual surface region 1001 of the virtual cylindrical structure 11; and the extreme distal centers 01 are farthest boundary nodes of the recess area 3.

Figure 20:
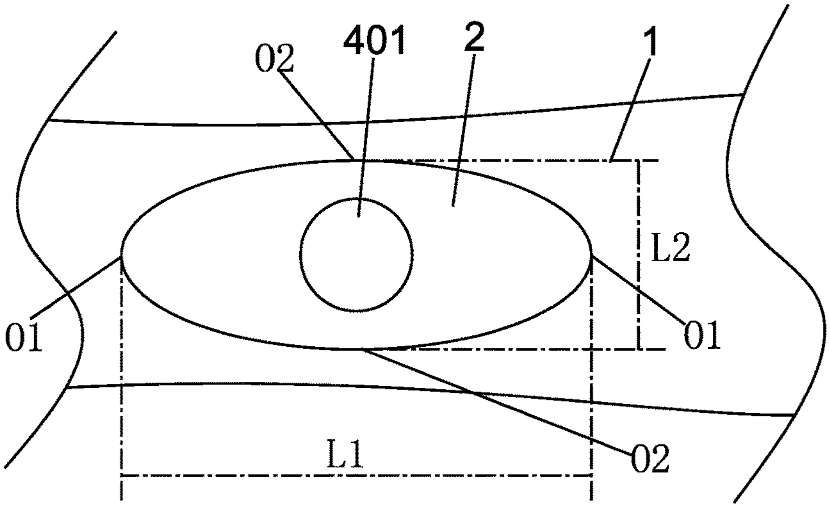
FIG. 20 is a first structural schematic diagram of a recess area in a plug-in massage structure according to the present disclosure (the recess area has an elliptical structure).

As shown in FIGS. 9 and 20, the recess area 3 has a second parameter L2, and a value range of the second parameter L2 is 10 mm-30 mm;

where the second parameter L2 is a maximum radial distance between two extreme distal centers 02 of the recess area 3 away from the center of the virtual surface region 1001 of the virtual cylindrical structure 11; and the extreme distal centers 02 are farthest boundary nodes of the recess area 3.

In this embodiment, the recess area 3 can in in a regular shape, such as a rectangle, a circle, an ellipse, or the like, or can be in an irregular shape, therefore, a maximum width and a maximum length of the recess area 3 are defined.

A dimension of the recess area 3 determines an area of an action region of the massage elements 401 to a certain extent. Although the area of the action area is positively correlated with the stimulation sensation, consideration needs to be given to the following points:

first, as the area of the action area increases, the massaged region radiated by the massage elements 401 increases simultaneously, such that a risk of contacting the wound by the massage elements 401 is increased; and second, although the recess area 3 increases the degree of freedom of the massage elements 401 to a certain extent, but an excessively high degree of freedom will cause excessive stimulation to the inner cavity, resulting in massage pain.

Based on this, within the aforementioned ranges, the degree of freedom that the recess area 3 exerts on the massage elements 401 falls within a desired range, making a limit action space for the massage elements; and when the massage elements 401 retract to the extreme positions, the recess area 3 places the constraint on the massage elements, and limits the massaged region radiated by the massage elements 401 to a certain extent, and reduces a risk of secondary injury to the wound due to excessive massaged region, such that the stimulation effects of the massage elements 401 are more concentrated to ensure the stronger stimulation sensation.

As shown in FIG. 9, a seventh embodiment of the present disclosure provides a plug-in massage structure, and a value range of the depth M of the recess area 3 is 8 mm-20 mm;

and/or, the recess area 3 has a third parameter b, and a value range of the third parameter b is 90°-135°; and the third parameter b is an included angle between an inner wall surface of the recess area and the bottom of the recess area 3.

In this embodiment, edges of the recess area 3 are arranged in an inclined manner, which may take a value within the value range of the included angle b.

Further, the recess area 3 can be a regular shape or an irregular shape, which is not specifically limited herein. Therefore, any structure with a recess on the circumferential wall surface of the carrier 1 will fall within the protection scope of the present disclosure.

An eighth embodiment of the present disclosure provides a plug-in massage structure, where the stimulation surface is a curved surface, and a maximum curvature radius R of the curved surface ranges from 5 mm-10 mm.

A value range of a swing angle $\alpha$ when the massage elements 401 perform the swing action is 30°-60°.

In this embodiment, one or more massage elements 401 can be provided.

Reasons for limiting various parameters of the massage elements 401 are as follows:

First, the massage element 401, as a main body for forming the massage surface, directly or indirectly act on the hole-shaped part to be massaged 2; and when a curvature radius (when the massage element is a sphere or a hemisphere) of the massage element is too large, an area of a force-bearing surface of the massage element is increased, such that a feeling of blockage of the massage action is increased accordingly. When the curvature radius of the massage element is too small, the area of the force-bearing surface of the massage element is reduced, such that a feeling of massage pain applied to the hole-shaped part to be massaged 2 is increased, and a level of comfort is reduced.

Second, when the massage element 401 performs the swing action, a swing angle of the massage element will affect the area of the massaged region; and a large swing angle will make the amplitude of the massage element reduced, such that concentration and stimulation sensation of massage will be weakened.

Based on the foregoing two reasons, the present disclosure limits various parameters of the massage element 401 according to the foregoing parameters, such that the massage element 401 can improve the concentration of massage stimulation and reduce the massage pain on the premise of ensuring a larger massaged region. Further, it is ensured that the massaged region radiated by the swing length and the swing angle does not excessively result in great deformation of the hole-shaped part to be massaged 2, and the degree of massage stimulation is improved.

Figure 19:
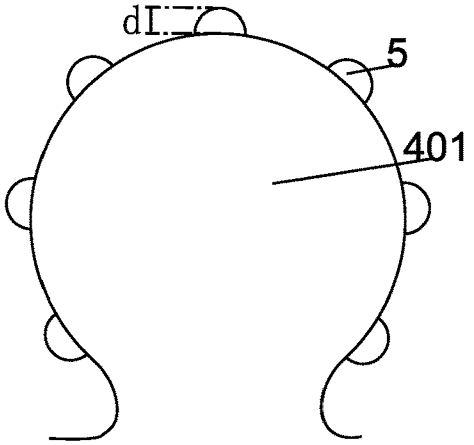
FIG. 19 is a structural schematic diagram of humps in a plug-in massage structure according to the present disclosure.

As shown in FIG. 19, a ninth embodiment of the present disclosure provides a plug-in massage structure, and on the basis of the previous embodiment, the plug-in massage structure further includes:

humps 5 formed on the circumferential wall surface of the massage element 401 or formed on a surface of the flexible surface 101; and where the humps 5 are bulged relative to the circumferential wall surface of the massage element 401, and a value range of a bulge height d is 1 mm-3 mm.

In this embodiment, the humps 5 are further included.

As described above, the presentation forms of the massage element 401 are divided into two types:

First, the massage element 401 is independent of the carrier 1, the circumferential wall surface of the massage element, as the massage surface, is in direct contact with the hole-shaped part to be massaged 2, and in order to improve the massage stimulation effects, the humps 5 can be disposed on the circumferential wall surface of the massage element 401.

Second, the massage element 401 is blocked by the flexible surface 101, such that the flexible surface 101 is promoted to deform to produce the massage stimulation. Therefore, the humps 5 may be disposed on the flexible surface 101 to improve the massage stimulation effect of the flexible surface 101.

Of course, a large diameter size of the hump 5 will cause an injury to the hole-shaped part to be massaged 2, therefore, the bulge height of the humps 5 ranges from 1 mm-3 mm.

Further, the humps 5 can be made hard material or soft material, or hard material wrapped with soft material.

A tenth embodiment of the present disclosure provides a plug-in massage structure, and on the basis of the previous embodiment, as shown in FIGS. 4-7, the massage element 401 is one or more of a sphere, a hemisphere, a block, a column, and a tongue-shaped.

In this embodiment, a shape of the massage element 401 can also be adaptively changed according to the stimulation sensation desired by the user.

For example, when a female desires a stronger stimulation sensation, the massage elements 401 can be configured as the tongue-shaped, the column or the block, which generates a larger contact area, and can produce different stimulation effects in cooperation with different massage actions of the massage elements 401.

When the female has greater need for the postpartum recovery, the massage element 401 can be configured as the sphere, the hemisphere, or the like, which generates a smaller contact area, and can produce more concentrated massage effects, being beneficial to the recovery of the wound.

Figure 21:
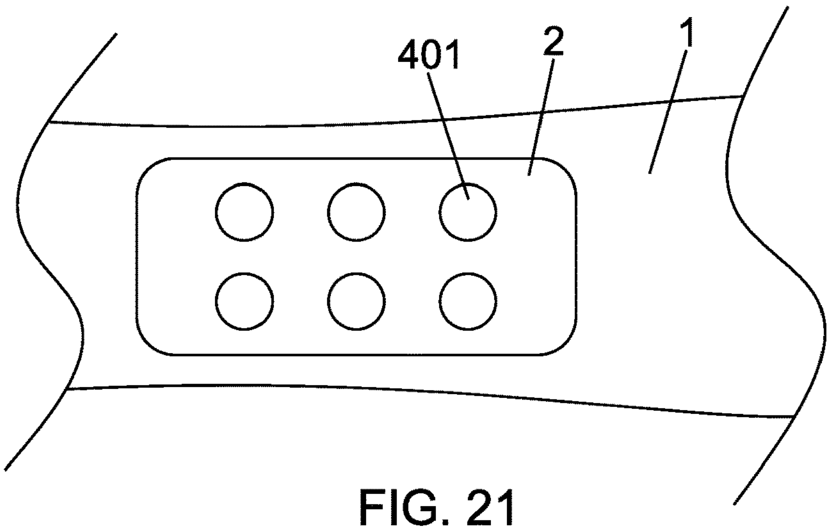
FIG. 21 is a second structural schematic diagram of a recess area in a plug-in massage structure according to the present disclosure (the recess area rectangular, and massage elements are arranged in a plurality of rows and columns).
Figure 22:
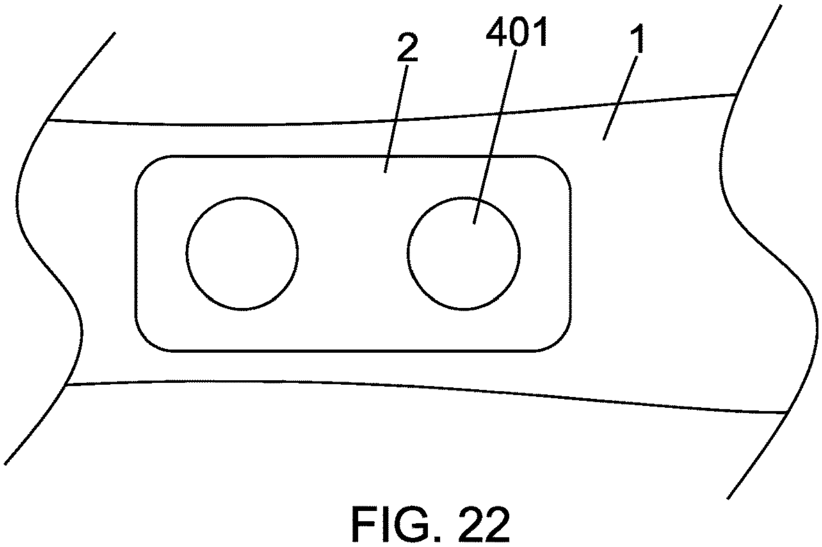
FIG. 22 is a third structural schematic diagram of a recess area in a plug-in massage structure according to the present disclosure (the recess area rectangular, and massage elements are arranged in a single row or a single column).
Figure 23:
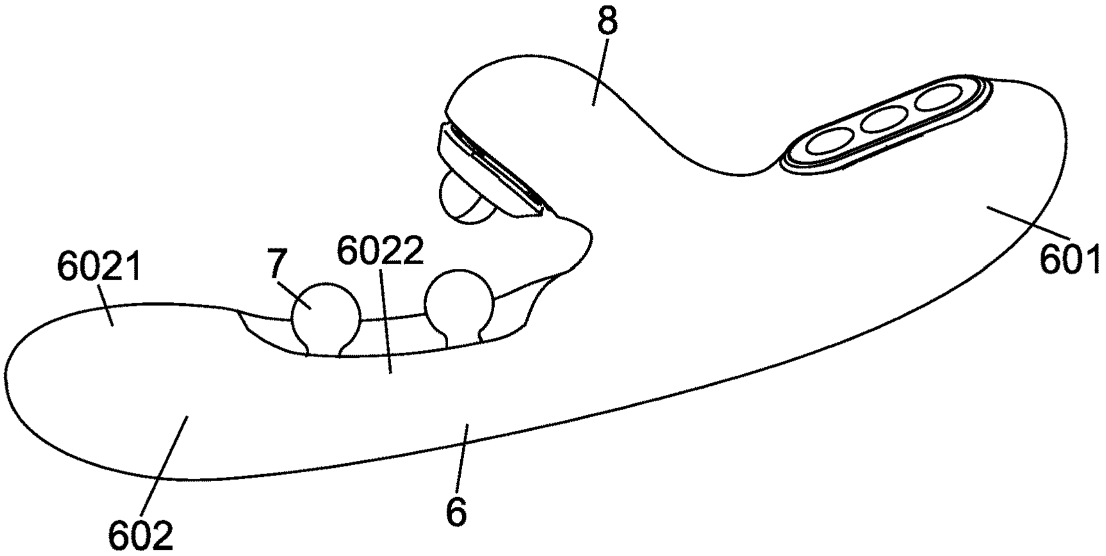
FIG. 23 is a first perspective view of a plug-in massage device according to the present disclosure (massage elements are of spherical structure).
Figure 24:
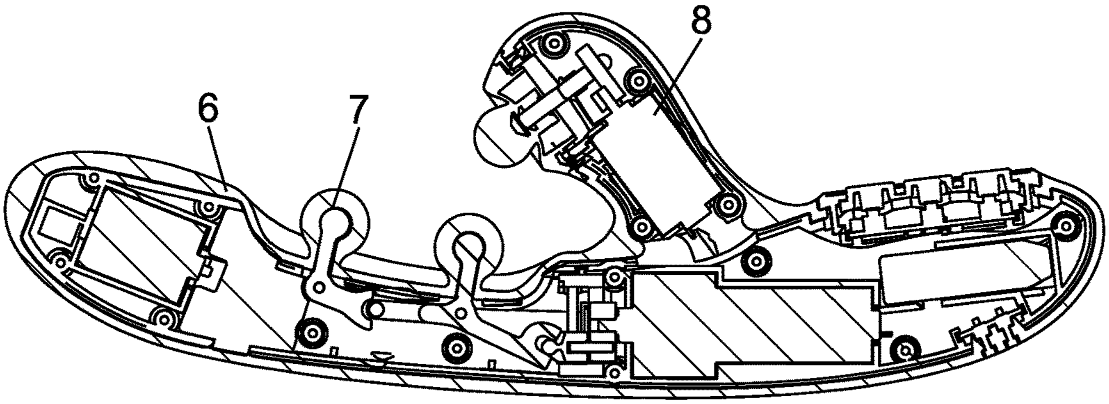
FIG. 24 is a sectional view of a plug-in massage device according to the present disclosure.
Figure 25:
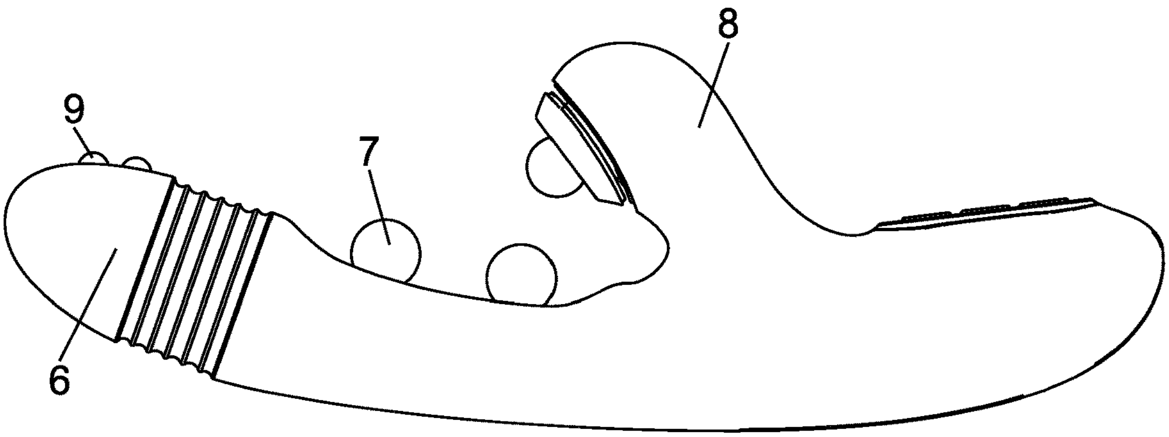
FIG. 25 is a second perspective view of a plug-in massage device according to the present disclosure (a first massage body is of telescopic structure).
Figure 26:
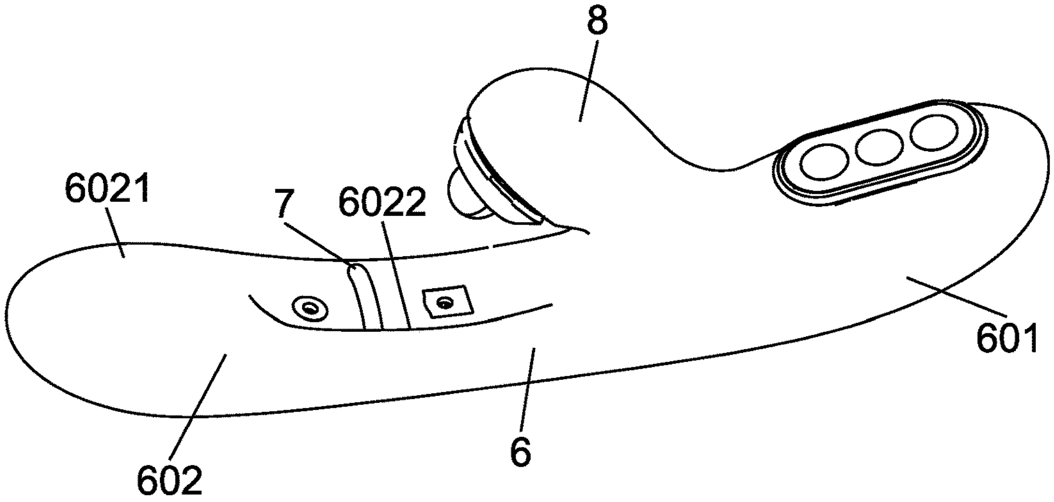
FIG. 26 is a third perspective view of a plug-in massage device according to the present disclosure (massage elements are of semi-ring structure).
Figure 27:
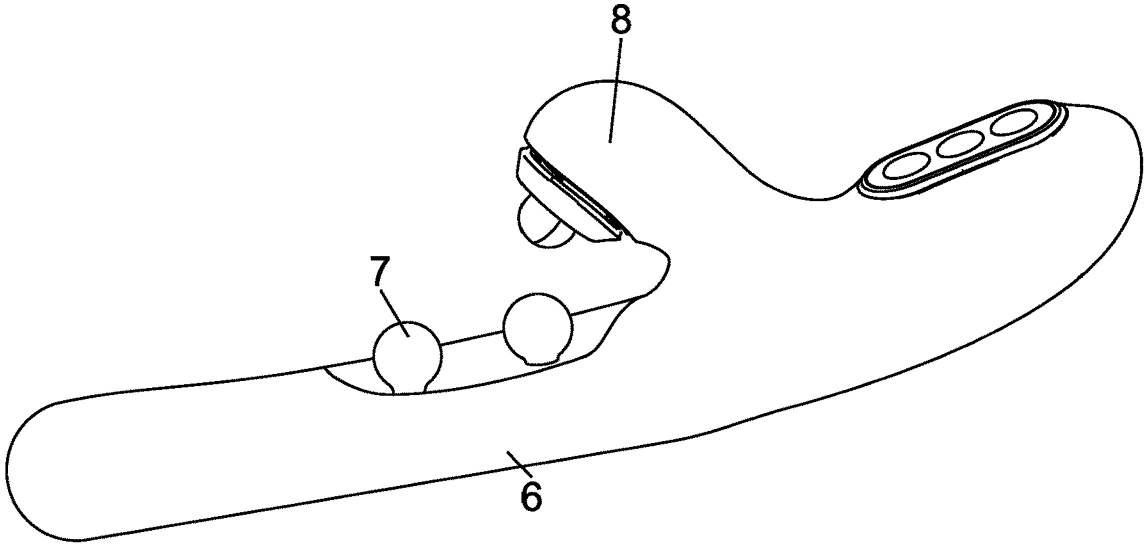
FIG. 27 is a fourth perspective view of a plug-in massage device according to the present disclosure (a first massage body is straight rod-shaped).
Figure 28:
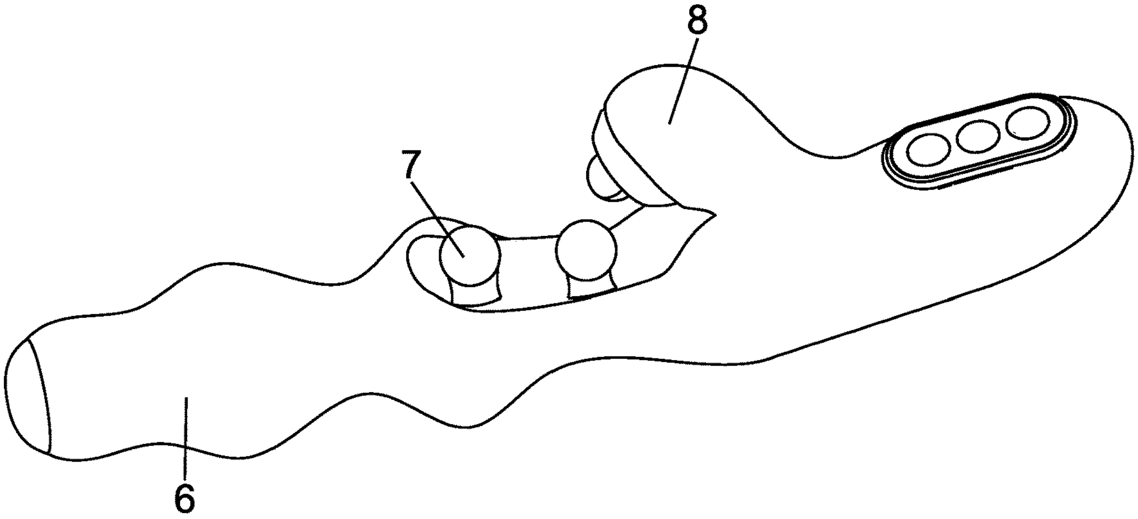
FIG. 28 is a fifth perspective view of a plug-in massage device according to the present disclosure (a first massage body is wavy).
Figure 29:
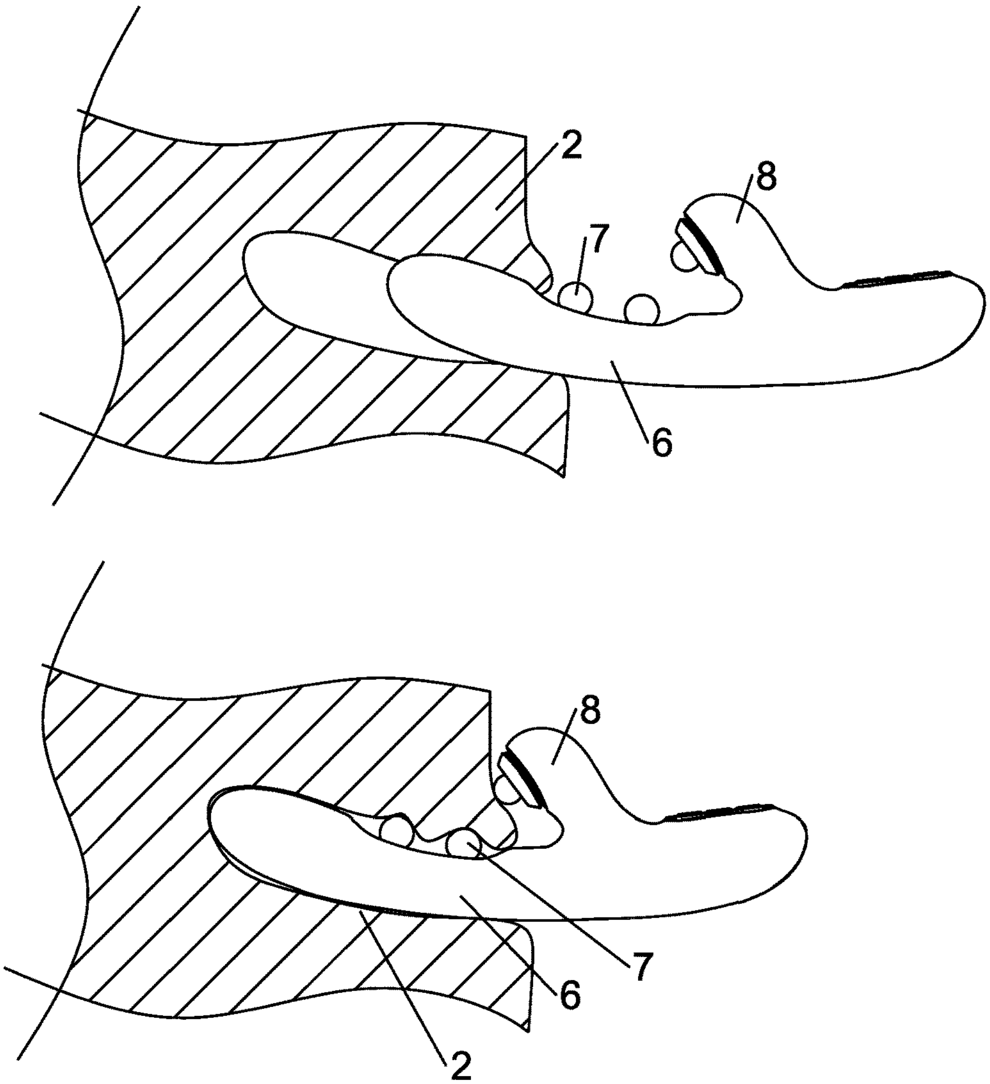
FIG. 29 is a schematic diagram of a state of use of a plug-in massage device according to the present disclosure.

As shown in FIGS. 20-22, an eleventh embodiment of the present disclosure provides a plug-in massage structure, and on the basis of the previous embodiment, the massage elements 401 are arranged in a single row or a single column, or the massage elements 401 are arranged in a plurality of rows and columns, a number of the massage elements is N, and a value range of N is 1-4.

In this embodiment, the massage elements 401 can be arranged in the single row or the single column, such that the action effects are more concentrated action and the degree of massage stimulation is more concentrated. The massage elements can also be arranged in the plurality of rows and columns, such that the action area 1011 is larger, and the massage stimulation is stronger.

As shown in FIG. 1, a twelfth embodiment of the present disclosure provides a plug-in massage structure, and on the basis of the previous embodiment, the carrier 1 has a length L3 in an axial direction, and a value range of L3 is 60 mm-150 mm; and an axis of the carrier 1 is a straight line or a curve.

In this embodiment, the length L3 of the carrier 1 is defined, which may be selected, as needed, within a range of 60 mm-150 mm.

Of course, the axis of the carrier 1 can be the straight line or the curve, that is, the appearance of the carrier 1 can be linear, streamlined (with a large diameter at a front end and a small diameter at a rear end, or vice versa), curved (with a single inflection point or a plurality of inflection points), and the like.

A thirteenth embodiment of the present disclosure provides a plug-in massage structure, and on the basis of the previous embodiment, a number of the recess areas 3 is M, and M meets:

M=1 or M>1; and when M>1, a plurality of recess areas 3 are arranged at intervals on the circumferential wall surface of the carrier 1, and are located on a same loop line or different loop lines of the same circumferential wall surface.

In this embodiment, one or more recess areas 3 can be provided.

When a plurality of recess areas 3 are provided, they can be arranged the circumferential wall surface of the carrier 1, such that a number of massaged regions radiated by the massage elements 401 are increased, and the massage stimulation effects are improved.

A fourth embodiment of the present disclosure provides a plug-in massage structure, and on the basis of the previous embodiment, the massage assembly 4 includes:

the driving assembly 402 connected to the massage element 401.

In this embodiment, the driving assembly 402 (such as a motor) can drive the massage element 401 to perform actions at a same frequency, that is, a movement speed and a movement amplitude of the massage element 401 are the same. Alternatively, the massage element 401 can be driven to perform actions at different frequencies, that is, the movement speed and the movement amplitude of the massage element 401 are different to improve the massage effects.

As shown in FIGS. 23-29, a fifth embodiment of the present disclosure provides a plug-in massage device, at least including:

a first massage body 6; and the plug-in massage structure 7 according to any one of the above embodiments is disposed on the first massage body 6; and the carrier of the plug-in massage structure 7 forms a plug-in end 602 of the first massage body 6, and the first massage body has a handheld end 601 in a direction away from the plug-in end 602.

In this embodiment, the plug-in massage device has all of the above beneficial effects, which will not be described in detail herein.

Further, the carrier of the plug-in massage structure 7 forms a front end structure of the first massage body 6, and is configured to be completely inserted into the hole-shaped part to be massaged, and a rear end of the first massage body 6 is the handheld end 601 to enable the user to hold the device.

On the basis of the above, the device further includes:

a second massage body 8 disposed on the first massage body 6 and located on one side of the plug-in massage structure 7.

In this embodiment, the plug-in massage structure 7 is a massage structure for the inner wall (such as the vagina) of the hole-shaped part to be massaged, and the second massage body 8 is a massage structure for an outer part (such as a clitoris) of hole-shaped part to be massaged, and the plug-in massage structure and the second massage body jointly perform the massage actions to ensure that the stimulation sensation is stronger.

On this basis, the first massage body 6 and the second massage body 8 may adopt a telescopic structure, a sucking structure, a vibrating structure, or a tapping structure to produce various massage effects. Of course, each of the above structures has been described in the prior art, and will not be described in detail herein. The first massage body 6 can be curved, straight rod-shaped, wavy, or the like.

A combination of various massage actions makes the plug-in massage device provided in the present disclosure more adaptable to meet various needs of different users.

On the basis of the above, the device further includes:

stimulation structures 9 disposed on the first massage body 6 and/or the second massage body 8;

the stimulation structures 9 are at least soft or hard; and the stimulation structures 9 are at least one or more of a sphere, a hemisphere, a block, a column, a tongue-shaped.

In this embodiment, the stimulation structures 9 are configured to improve the stimulation effects, so as to increase the massage sensation.

On the basis of the above, the first massage body 6 and/or the second massage body 8 have:

an elastic element, where the elastic element is at least configured to allow the first massage body 6 and/or the second massage body 8 to be in flexible contact with the inner cavity of the hole-shaped part to be massaged 2.

The clastic element can be an elastic layer, such as silica gel or rubber, covering the first massage body 6 and/or the second massage body 8, so as to improve the level of comfort of contact between the first massage body 6 and the second massage body 8 and skin.

On the basis of the above, the plug-in end 602 of the first massage body 6 at least includes:

a first insertion section 6021 and a second insertion section 6022;

where the plug-in massage structure 7 is disposed on the first insertion section 6021;

a diameter of the first insertion section 6021 is D2, and a diameter of the second insertion section 6022 is D3;

further, D2=K×D3; and

A value range of D3 is 20 mm-50 mm, and a value range of K is 0.6-0.9.

In this embodiment, the first insertion section 6021 and the second insertion section 6022 are both configured to be inserted into the hole-shaped part to be massaged. Their diameter sizes may be the same or different, and different diameter sizes can be selected within the above value range.

In the description of the embodiments of the present disclosure, it should be understood that the terms "upper", "lower", "front", "back", "left", "right", "vertical", "horizontal", "central", "top", "bottom", "top surface", "bottom surface", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been shown and described, it can be understood by those skilled in the art that several changes, modifications, substitutions and alterations can be made to these examples without departing from the principles and spirit of the present disclosure, and the scope of the present disclosure is defined by the appended claims and their equivalents.

What is claimed is:

1. A plug-in massage structure, at least comprising:

a carrier having a cylindrical area and a recess area, wherein the carrier is allowed to be fully inserted into a hole-shaped part to be massaged; wherein the cylindrical area is an approximately cylindrical structure configured to be matched with an inner cavity of the hole-shaped part to be massaged;

the recess area has a tunnel-shaped recess structure conforming to a virtual cylinder, and the virtual cylinder is a virtual cylindrical structure formed by the cylindrical area having a cylindrical end surface of the cylindrical area and extending to the recess area;

a depth of the recess area is M, and M is a height of a tunnel center line of the tunnel-shaped recess structure; and a massage assembly having massage elements disposed in the recess area; wherein each of the massage elements has a degree of freedom in the recess area, is structured as a protrusion, has a stimulation surface, is fixed to a base through a rod structure that is integrated into the respective stimulation surface, wherein the base and the rod structure are configured such that a force is transmitted via the rod structure to the respective massage element to implement a massage.

2. The plug-in massage structure according to claim 1, wherein the stimulation surface is configured to interact with the inner cavity of the hole-shaped part to be massaged;

a generation of effects is controlled by actions of the massage elements allowed by the degree of freedom; and the effects mean at least touch pressure effect, wherein the touch pressure effect is formed at a point in the inner cavity of the hole-shaped part to be massaged.

3. The plug-in massage structure according to claim 2, wherein the stimulation surface of each of the massage elements has a height h0; wherein the height h0 is a maximum value of a vertical distance from a center of the stimulation surface to a top of the recess area; and 1 mm≤h0−M≤5 mm.

4. The plug-in massage structure according to claim 2, wherein the stimulation surface is a curved surface, and a maximum curvature radius R of the curved surface ranges from 5 mm-10 mm.

5. The plug-in massage structure according to claim 1, wherein the massage assembly has a first massage element of the massage elements and a second massage element of the massage elements;

within the degree of freedom, the massage assembly performs a reciprocating movement in an axis direction of the approximately cylindrical structure; and during the reciprocating movement, the first massage element and the second massage element move in opposite directions, forming repeated kneading actions.

6. The plug-in massage structure according to claim 5, wherein the first and second massage elements are configured to move within the degree of freedom to enable the stimulation surface of each of the first and second massage elements to have a first extreme position;

wherein, for each of the first and second massage elements, the first extreme position is a first maximum displacement position of the stimulation surface within an allowable stroke section of the degree of freedom;

the stimulation surface at the first extreme position has a height h1, and the height h1 is a maximum value of a vertical distance from a center of a top of the stimulation surface to a bottom of the recess area;

when a position of the stimulation surface changes only in a first direction, 1 mm≤h1−M≤5 mm;

when the position of the stimulation surface changes only in a second direction, 1 mm≤h1−M≤2 mm;

when the position of the stimulation surface changes in both the first direction and the second direction, 0.3 mm≤h1−M≤2 mm;

the first direction is a width or length direction of the recess area; and the second direction is a depth direction of the recess area.

7. The plug-in massage structure according to claim 6, wherein the first and second massage elements are configured to move within the degree of freedom to enable the stimulation surface to have a second extreme position;

wherein, for each of the first and second massage elements, the second extreme position is a second maximum displacement position of the stimulation surface within the allowable stroke section of the degree of freedom;

the stimulation surface at the second extreme position has a height h2, and the height h2 is the maximum value of the vertical distance from the center of the top of the stimulation surface to the bottom of the recess area;

when the position of the stimulation surface changes only in the first direction, 1 mm≤h2−M≤5 mm;

when the position of the stimulation surface changes only in the second direction, 3.5 mm≤h2−M≤6 mm;

when the position of the stimulation surface changes in both the first direction and the second direction, 2.5 mm≤h2−M≤25 mm;

the first direction is the width or length direction of the recess area; and the second direction is the depth direction of the recess area.

8. The plug-in massage structure according to claim 1, wherein a value range of the depth M of the recess area is 8 mm-20 mm; and/or the recess area has a first parameter, and a value range of the first parameter is 20 mm-100 mm; and the first parameter is a maximum axial distance between two first extreme distal centers of the recess area away from a center of a virtual surface region of the virtual cylindrical structure.

9. The plug-in massage structure according to claim 8, wherein the recess area has a second parameter, and a value range of the second parameter is 10 mm-30 mm; and the second parameter is a maximum radial distance between two second extreme distal centers of the recess area away from the center of the virtual surface region of the virtual cylindrical structure.

10. The plug-in massage structure according to claim 9, wherein the recess area has a third parameter b, and a value range of the third parameter b is 90°-135°; and the third parameter b is an included angle between an inner wall surface of the recess area and a bottom of the recess area.

11. The plug-in massage structure according to claim 1, wherein the massage assembly comprises:

a driving assembly connected to the massage assembly.

12. The plug-in massage structure according to claim 1, wherein the massage elements are at least one of a sphere, a hemisphere, a block, a column, and a tongue-shaped.

13. The plug-in massage structure according to claim 1, wherein a number of the massage elements is N, and a value range of N is 1-4.

14. A plug-in massage device, at least comprising:

a first massage body; and the plug-in massage structure according to claim 1 disposed on the first massage body; wherein the carrier of the plug-in massage structure forms a plug-in end of the first massage body, and the first massage body has a handheld end in a direction away from the plug-in end.

15. The plug-in massage device according to claim 14, further comprising:

a second massage body disposed on the first massage body and located on one side of the plug-in massage structure.

16. The plug-in massage device according to claim 15, wherein the first massage body and/or the second massage body have:

an elastic element, wherein the elastic element is at least configured to allow the first massage body and/or the second massage body to be in flexible contact with the inner cavity of the hole-shaped part to be massaged.

* * * * *